(12) United States Patent
Nishimori et al.

(10) Patent No.: US 8,587,265 B2
(45) Date of Patent: Nov. 19, 2013

(54) CONTROL CIRCUIT FOR DC-DC CONVERTER, DC-DC CONVERTER, AND METHOD FOR CONTROLLING DC-DC CONVERTER

(75) Inventors: Eiji Nishimori, Kasugai (JP); Yoshihiko Matsuo, Yokohama (JP); Osamu Takahashi, Yokohama (JP); Takeshi Kimura, Yokohama (JP)

(73) Assignee: Spansion LLC, Sunnyvale, CA (US)

( * ) Notice: Subject to any disclaimer, the term of this patent is extended or adjusted under 35 U.S.C. 154(b) by 382 days.

(21) Appl. No.: 12/717,681

(22) Filed: Mar. 4, 2010

(65) Prior Publication Data

US 2010/0225292 A1 Sep. 9, 2010

(30) Foreign Application Priority Data

Mar. 5, 2009 (JP) ................................. 2009-052135

(51) Int. Cl.
*G05F 1/00* (2006.01)
(52) U.S. Cl.
USPC ............................ 323/242; 323/243; 323/285
(58) Field of Classification Search
USPC ......... 323/222, 242, 243, 244, 282, 284, 285; 327/131, 132, 133, 134, 137
See application file for complete search history.

(56) References Cited

U.S. PATENT DOCUMENTS

| | | | | |
|---|---|---|---|---|
| 6,882,132 | B2* | 4/2005 | Haase | 323/283 |
| 7,098,631 | B2* | 8/2006 | Cohen | 323/222 |
| 7,589,509 | B2* | 9/2009 | Nishida | 323/283 |
| 8,022,680 | B2* | 9/2011 | Ryoo | 323/282 |
| 2004/0145927 | A1 | 7/2004 | Haase | |
| 2005/0286269 | A1 | 12/2005 | Groom | |
| 2007/0120547 | A1 | 5/2007 | Tateishi et al. | |
| 2007/0285073 | A1* | 12/2007 | Nishida | 323/288 |
| 2009/0160416 | A1* | 6/2009 | Kawagishi et al. | 323/288 |

* cited by examiner

*Primary Examiner* — Nguyen Tran
(74) *Attorney, Agent, or Firm* — Sterne, Kessler, Goldstein & Fox P.L.L.C.

(57) ABSTRACT

A DC-DC converter control circuit includes: a slope signal generation circuit that generates a reference voltage by superimposing a slope voltage onto a standard voltage; a comparator that performs comparison of the reference voltage with an output voltage and generates a signal according to a result of the comparison; an oscillator that generates a pulse signal with a substantially constant cycle; and a control signal generation circuit that generates a control signal that turns on a switch based on a comparator output signal and turns off the switch based on the pulse signal.

14 Claims, 18 Drawing Sheets

CONTROL CIRCUIT FOR DC-DC CONVERTER, DC-DC CONVERTER, AND METHOD FOR CONTROLLING DC-DC CONVERTER

CROSS-REFERENCE TO RELATED APPLICATIONS

This application is based upon and claims the benefit of priority of the prior Japanese Patent Application No. 2009-52135, filed on Mar. 5, 2009, the entire contents of which are incorporated herein by reference.

FIELD

The present disclosure relates to a control circuit of a direct-current to direct-current (DC-DC) converter, DC-DC converter, and a control method thereof.

BACKGROUND

A DC-DC converter that generates an output voltage by on/off controlling a switch to boost and step-down a DC input voltage performs feedback control so as to maintain the output voltage supplied to a load to a constant target voltage (for example, U.S. published application No. 2005/0286269 and U.S. published application No. 2007/0120547). As a method to control a switch, a Pulse Width Modulation (PWM) method and a Pulse Frequency Modulation (PFM) method are known.

A PWM method DC-DC converter adjusts an output voltage by fixing a switching frequency and controlling an on-time of a switch by comparing an output of an error amplifier that is generated based on an output voltage and a standard voltage with a saw-tooth signal waveform. The PWM method fixes a switching frequency, thus occurrence of noise due to a switching operation of the known frequency is easily expected, and noise may be easily avoided from the system side during the design.

In the PWM method, an error such as double pulsing may be caused unless frequency characteristics of an error amplifier are set to 1/10 to 1/20 of the switching frequency of a switching element. In other words, if a band of a feedback response according to an output voltage of the DC-DC converter is not sufficiently lower than the switching frequency, an abnormal switching operation may be caused. Thus, there is a drawback in which a high-speed response is not possible for an abrupt change of a load.

The PFM method DC-DC converter adjusts an output voltage by adjusting a frequency of a control signal that controls the on and off of a switch by comparing a fixed output voltage and a standard voltage. Thus, the PFM method DC-DC converter does not need an error amplifier and allows a high-speed response for an abrupt load change.

However, a switching frequency of the above described PFM method DC-DC converter varies due to a difference between an input voltage and an output voltage, and a load change, and thereby noise measures are difficult to apply. As a result, performance of devices that uses a small signal with high frequency such as audio/video devices may be degenerated.

SUMMARY

According to an aspect of an embodiment, a DC-DC converter control circuit includes: a slope signal generation circuit that generates a reference voltage by superimposing a slope voltage onto a standard voltage; a comparator that performs comparison of the reference voltage with an output voltage and generates a signal according to a result of the comparison; an oscillator that generates a pulse signal with a substantially constant cycle; and a control signal generation circuit that generates a control signal that turns on a switch based on a comparator output signal and turns off the switch based on the pulse signal.

It is to be understood that both the foregoing summary description and the following detailed description are exemplary and explanatory and are not restrictive of the invention, as claimed.

DESCRIPTION OF EMBODIMENTS (First Embodiment)

Hereunder, a first embodiment will be described by referring to FIGS. 1 to 5.

Figure 1:
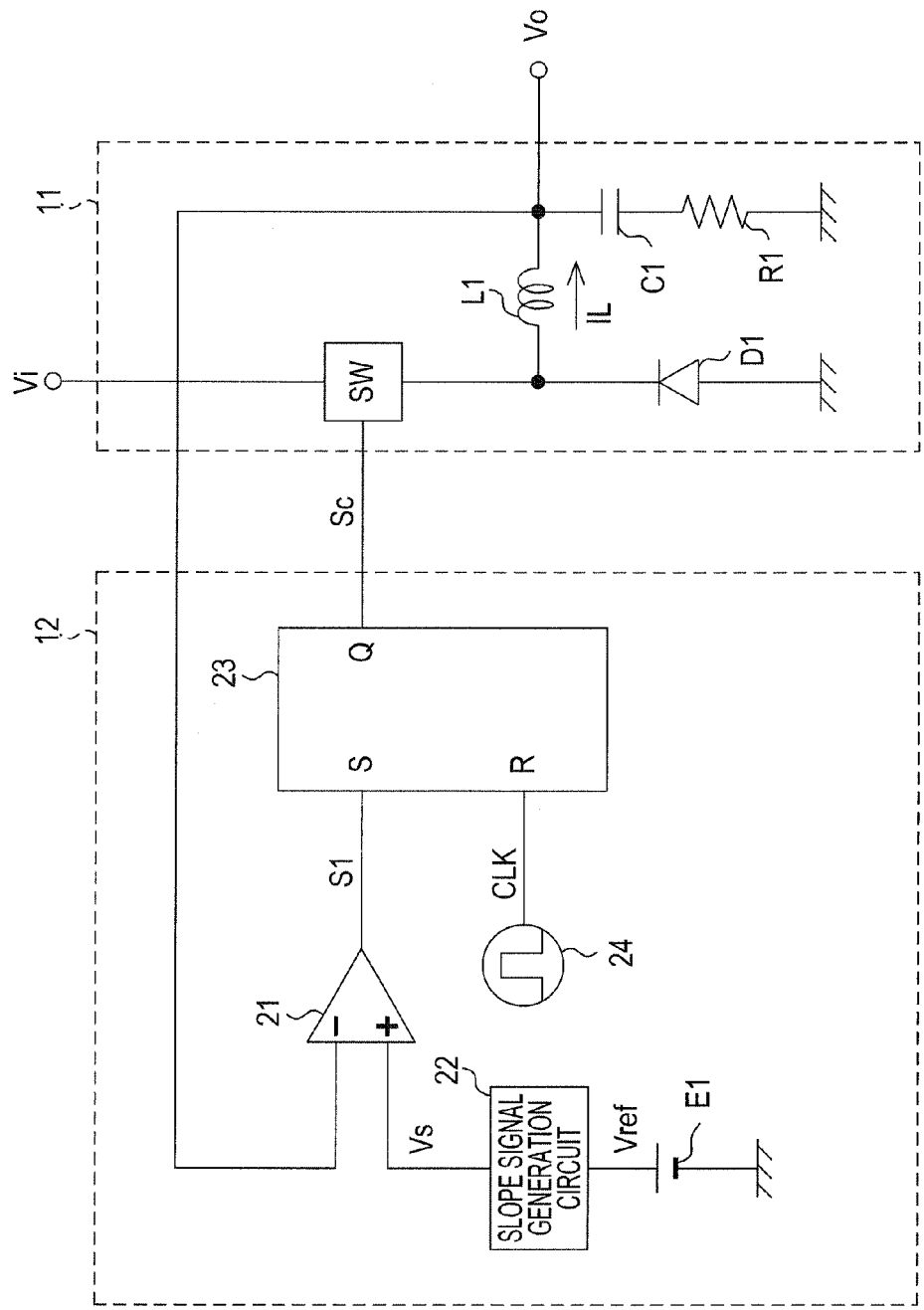
FIG. 1 is a block circuit diagram of a DC-DC converter according to a first embodiment.

As illustrated in FIG. 1, a DC-DC converter includes a converter unit 11 that generates an output voltage Vo based on an input voltage Vi, and a control circuit 12 that controls the converter unit 11 based on the output voltage Vo.

The converter unit 11 includes a switch SW, a diode D1, an inductor L1, and a smoothing capacitor C1. The switch SW is coupled between a power line that supplies the input voltage Vi, and the diode D1. The control circuit 12 supplies a control signal Sc to a control terminal of the switch SW. The switch SW is, for example, an n-channel MOS transistor. The switch SW has a first terminal (a drain terminal) which is coupled to the power line that supplies the input voltage Vi, a second terminal (a source terminal) which is coupled to the diode D1, and a control terminal (gate terminal) which is supplied with the control signal Sc.

An anode of the diode D1 is coupled to a power line (a ground according to the embodiment), the potential of which is lower than the input voltage Vi. A cathode of the diode D1 is coupled to the switch SW. A coupling point between the switch SW and the diode D1 is coupled to a first terminal (input side terminal) of the inductor L1. A second terminal (output side terminal)) of the inductor L1 is coupled to a first terminal (input side terminal) of the smoothing capacitor C1, and a second terminal of the capacitor C1 is coupled to a ground. The capacitor C1 is included in a smoothing circuit that smoothes the output voltage Vo. A resistor R1 that is coupled between the capacitor C1 and the ground illustrated in FIG. 1 is a resistance element (Equivalent Series Resistance (ESR)) generated between the inductor L1 and the ground by forming a capacitor C1.

The switch SW turns on and off in response to a control signal Sc. An inductor current IL, according to a difference between an input voltage Vi and an output voltage Vo, flows through the inductor L1 when the switch SW turns on and thereby the inductor L1 accumulates energy. The inductor L1 discharges the accumulated energy to apply an induced current (inductor current IL) when the switch SW turns off.

The control circuit 12 includes a comparator 21, a slope signal generation circuit 22, and an RS-flip flop circuit (RS-FF circuit) 23 as a control signal generation circuit, an oscillator 24, and a reference supply E1.

The output voltage Vo is supplied to an inverting input terminal of the comparator 21. Therefore, an amount of variation in the output voltage Vo is immediately transmitted to the comparator 21. The slope signal generation circuit 22 is coupled to a non-inverting input terminal of the comparator 21. A reference voltage Vref is supplied from the reference supply E1 to the slope signal generation circuit 22. The reference voltage Vref is set based on a target voltage of the output voltage Vo.

The slope signal generation circuit 22 generates a slope signal with a waveform of a given slope. The slope signal increases with a given slope from a reset potential and is reset to a reset voltage substantially in synchronization with a timing of turning off the switch SW during a switching cycle from turning on to turning off the switch SW.

For example, the slope signal generation circuit 22 superimposes the voltage of the slope signal onto the reference voltage Vref. In other words, the slope signal generation circuit 22 generates a waveform of a reference voltage Vs with a given slope assuming a reference voltage Vref as a reset voltage. That is, the reference voltage Vs increases with a given slope (change amount) during a period from turning on the switch SW to the next turning on the switch SW, in other words, a switching period, and is reset to a reference voltage Vref. For example, a reset voltage is a reference voltage Vref and the slope signal increases with a given slope from the reference voltage Vref and is reset to the reference voltage Vref substantially in synchronization with the timing of turning off the switch SW.

The output voltage Vo does not fall below the reference voltage Vs if a slope amount of the slope signal is small. In other words, the waveform of the output voltage Vo and the waveform of the reference voltage do not overlap. Accordingly, a skip of the switching cycle is caused in that the switch SW is not turned on in one switching cycle. Alternatively, the switch SW is turned on only for a very short period. As a result, a value of the smoothed inductor current IL (output voltage Vo) is reduced, and thereby subharmonic oscillation is caused.

Therefore, amplitude (slope amount) of a slope signal in the slope signal generation circuit 22 is set larger than a ripple amount of a voltage in the inverting input terminal of the comparator 21. According to the embodiment, the output voltage Vo is fed back to the comparator 21, and the slope amount of the slope signal is set larger than a ripple amount of the output voltage Vo. Thus, a slope in which the slope signal rises is greater than the slope in which the voltage Vo rises, and the slope signal set in the above manner is supplied to the reference voltage Vref.

Setting the above-described slope amount suppresses subharmonic oscillation. The slope amount may be variable, as will be described later.

The comparator 21 compares the output voltage Vo with the reference voltage Vs and generates an output signal S1 according to the comparison result. For example, the comparator 21 generates an L level output signal S1 (detection signal) that is a reset signal, when the output voltage Vo is higher than the reference voltage Vs. On the other hand, the comparator 21 generates an H level output signal S1 when an output voltage Vo is lower than a reference voltage VS.

In the RS-FF circuit 23, a set terminal S is coupled to the comparator 21 and a reset terminal R is coupled to the oscillator 24. The oscillator 24 generates a clock signal CLK (for example, a pulse signal generated in a substantially constant cycle) with a given frequency. The RS-FF circuit 23 outputs an H level control signal Sc in response to an H level signal S1 supplied to the set terminal S, and an L level control signal Sc in response to an H level clock signal CLK supplied to the reset terminal R. The control signal Sc is supplied to the switch SW and the switch SW is turned on and off in response to the control signal Sc.

As described above, the reference voltage Vs is a voltage that increases with a given slope. Thus, the control circuit 12 changes the timing to output an H level control signal Sc depending on the output voltage Vo. When an output voltage is high, the timing when the output voltage Vo falls below a reference voltage Vs is slower compared with when the output voltage Vo is low. In other words, a period from when an L level control signal Sc is output to an H level output signal Sc is output is extended. The control circuit 12 resets the control signal Sc to an L level in a substantially constant cycle. Therefore, the control circuit 12 shortens a period to output an H level control signal Sc when an output voltage Vo is higher compared with when the output voltage is low. In other words, the control circuit 12 changes a pulse width of the H level control signal Sc inversely proportional to the output voltage Vo.

In other words, the control circuit 12 generates a control signal Sc for controlling the switch SW to a first state (on state) based on the output voltage Vo, and generates a control signal Sc for controlling the switch SW to a second state (off state). The switch SW exemplified above is an n-channel MOS transistor. Hereunder, based on the exemplification, a configuration of the circuit and signal levels will be described. In other words, the control circuit 12 generates an H level control signal Sc for turning on the switch SW, and an L level control signal Sc for turning off the switch SW.

Moreover, the control circuit 12 changes timing to generate an H level control signal Sc based on the output voltage Vo. In other words, the control circuit 12 generates the control signal Sc so as to turn off the switch SW in a substantially constant cycle, and adjusts a pulse width of the control signal Sc based on the output voltage Vo. A cycle of the control signal Sc that controls the switch SW corresponds to a cycle of a switching operation of the DC-DC converter, in other words, a switching frequency.

Now, a configuration example of the slope signal generation circuit 22 will be described.

Figure 3:
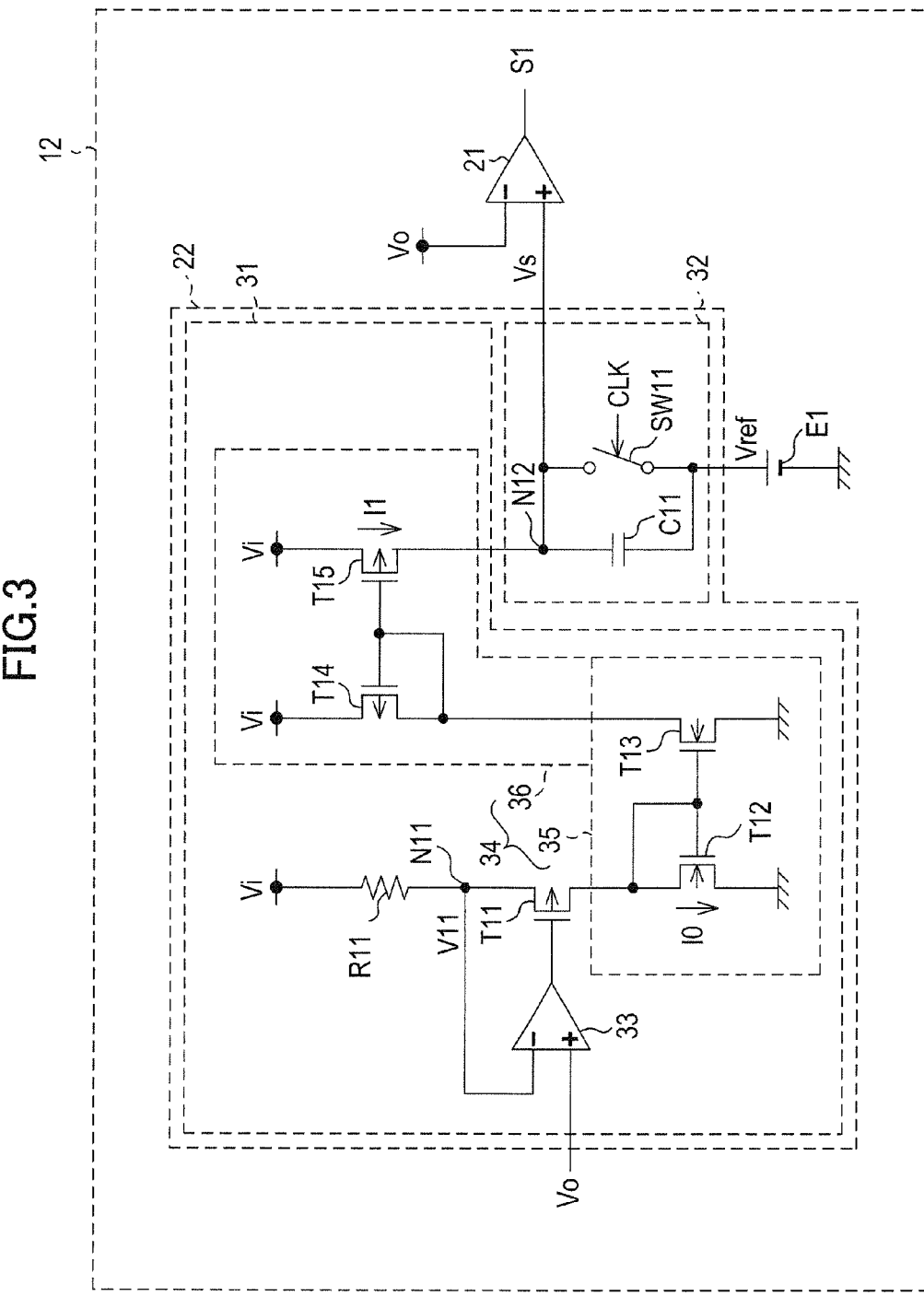
FIG. 3 is a circuit diagram of a control circuit 12 illustrated in FIG. 1.

As illustrated in FIG. 3, the slope signal generation circuit 22 includes a current generation circuit 31 and a charge and discharge circuit 32.

The current generation circuit 31 generates a current for generating a slope signal. The charge and discharge circuit 32 operates assuming a reference voltage Vref as a reference level and generates the reference voltage Vs obtained by superimposing the slope signal onto the reference voltage Vref by charging and discharging currents generated by the current generation circuit 31.

The current generation circuit 31 includes an operational amplifier 33, a current mirror circuit 34, a resistor R11, and a transistor T11.

An output voltage Vo is supplied to a non-inverting input terminal of the operational amplifier 33. A non-inverting input terminal of the operational amplifier 33 is coupled to a second terminal of the resistor R11, and an input voltage Vi is supplied to a first terminal of the resistor R11. The second terminal of the resistor R11 is coupled to the transistor T11. The transistor T11 is a p-channel MOS transistor. A source of the transistor T11 is coupled to the resistor R11, a gate of the transistor T11 is coupled to an output terminal of the operational amplifier 33, and a drain of the transistor T11 is coupled to the current mirror circuit 34.

The resistor R11 causes a voltage drop according to a current that flows through the resistor R11 and the resistance value. Therefore, a voltage V11 in a node N11 between the resistor R11 and the transistor T11 is a voltage dropped from an input voltage Vi by the resistor R11. The voltage V11 is supplied to the operational amplifier 33. The operational amplifier 33 outputs a signal S11 according to a differential voltage of the output voltage Vo and a node voltage V11 to a gate of the transistor T11. The transistor T11 applies a current according to a voltage of the signal S11. The operational amplifier 33 generates a signal S11 so as to match the output voltage Vo with the node voltage V11. With the configuration, a current flows through the transistor T11 according to the differential voltage of the input voltage Vi and the output voltage Vo.

A current mirror circuit 34 includes a first current mirror circuit 35 and a second current mirror circuit 36. The first current mirror circuit 35 includes transistors T12 and T13. The transistors T12 and T13 are n-channel MOS transistors. A drain of the transistor T12 is coupled to the transistor T11. Sources of the transistors T12 and T13 are coupled to respective grounds. A gate of the transistor 12 is coupled to a gate of the transistor T13 and a drain of the transistor T12. Hence, the first current mirror circuit 35 that includes the transistors T12 and T13 applies a current through the transistor T13 proportional to a current that flows through the transistor T12 according to electric characteristics.

The second current mirror circuit 36 includes transistors T14 and T15. The transistors T14 and T15 are p-channel MOS transistors. A drain of the transistor T14 is coupled to a transistor T13. Sources of the transistor T15 and the transistor T14 are supplied with input voltages Vi respectively. A gate of the transistor T14 is coupled to a gate of the transistor T15 and a drain of the transistor T14. Hence, the second current mirror circuit 36 that includes transistors T14 and T15 applies a current through the transistor T15 proportional to a current that flows through the transistor T14 according to electric characteristics.

In the current mirror circuit 34 configured as above, an input current I0 that is substantially the same as a current that flows through the transistor T11 flows through the transistor T12. The transistor T15 applies an output current proportional to the current I0 that flows through the transistor T12. The output current I1 of the current mirror circuit 34 is, for example 1/n times the input current I0. The ratio of the input current I0 to the output current I1 (n:1) is set according to the slope of a slope signal generated by the slope signal generation circuit 22. According to the embodiment, a size of the transistor T12 included in the first current mirror circuit 35 is n times the size of the transistor T13, and the sizes of the transistor T14 and T15 included in the second current mirror circuit 36 are substantially the same. Accordingly, 1/n of the input current I0 that flows through the transistor T12 flows through the transistor T13. Moreover, the output current I1 that is substantially the same as the current that flows through the transistor T13, in other words, substantially 1/n of the input current I0 flows through the transistor T15. The output current I1 is supplied to the charge and discharge circuit 32.

The charge and discharge circuit 32 includes a capacitor C11 and a switch SW11. A first terminal of the capacitor C11 is coupled to a drain of the transistor T15, and a second terminal of the capacitor C11 is coupled to the reference supply E1. Thus, a potential at the second terminal of the capacitor C11 is the reference voltage Vref level. The switch SW11 is coupled in parallel with the capacitor C11. The switch SW11 is, for example, an n-channel MOS transistor. A source and a drain of the switch SW11 are coupled to both terminals of the capacitor C11 respectively, and a clock signal CLK is supplied to a control terminal of the switch SW11, in other words, a gate of the transistor. The switch SW11 is turned on and off in response to the supplied clock signals CLK. A node between the current mirror circuit 34 and the charge and discharge circuit 32, in other words a node N12 between the transistor T15 and the capacitor C11 is coupled to the comparator 21.

The output current I1 of the current mirror circuit 34 is supplied to the capacitor C11. When the switch SW is turned on, both terminals of the capacitor C11 are short-circuited by the turned-on switch, thus, a potential of the node N12 is the reference voltage Vref level. When the switch SW is turned off, the capacitor C11 is charged by the current I1, and a voltage Vs of the node N12 rises due to the reference voltage Vref according to a capacitance value of the capacitance C11 and the output current I1. After a given time, when the switch SW11 is turned on, electric charges accumulated in the capacitor C11 are discharged and the voltage of the node N12 returns to the standard voltage level, in other words, the voltage is reset.

An operation of the above configured DC-DC converter will be described.

As illustrated in FIG. 2, the control circuit 12 outputs an L level control signal Sc in response to an H level clock signal CLK. When the switch SW is turned off by the L level control signal Sc, electro magnetic energy accumulated in the inductor L1 is discharged toward a load, and the output voltage Vo decreases gradually. The control circuit 12 makes the capacitor C11 discharge by turning on the switch SW11 illustrated in FIG. 3 in response to the H level clock signal CLK, and resets the reference voltage Vs to the reference voltage Vref level.

The control circuit 12 starts charging the capacitor C11 by turning off the switch SW11 illustrated in FIG. 3 in response to an L level clock signal CLK, and increases the reference voltage Vs with a given slope. The control circuit 12 outputs an H level control signal Sc by setting the RS-FF circuit 23 by an output signal S1 from the comparator 21 when the reference voltage Vs exceeds the output voltage Vo indicated by the solid line in FIG. 2. When the switch SW is turned on in response to the H level control signal Sc, an inductor current IL of the inductor L1 increases according to a differential voltage of the input voltage Vi and the output voltage Vo, electromagnetic energy is accumulated in the inductor L1, and the output voltage Vo gradually rises.

For example, when the output voltage Vo falls, for example, due to an abrupt change of load, the timing when the output voltage Vo becomes lower than the reference voltage Vs advances, and a period during which the H level control signal Sc is output is extended. In other words, the on-time of the switch SW is extended. On the other hand, when the output voltage Vo rises, the timing when the output voltage Vo becomes lower than the reference voltage Vs is delayed and a period during which the H level control signal Sc is output is shortened. In other words, the on-time of the switch SW is shortened.

The above described operation turns off the switch SW in a substantially constant cycle based on an oscillation frequency of the oscillator 24, and determines timing when turning on the switch SW based on the result of comparison between the output voltage Vo and the reference voltage VS. Therefore, timing when turning on the switch SW (on-time) is adjusted based on high and low of the output voltage Vo, and the output voltage Vo is maintained at a given voltage (target voltage) based on the reference voltage Vref.

Figure 4:
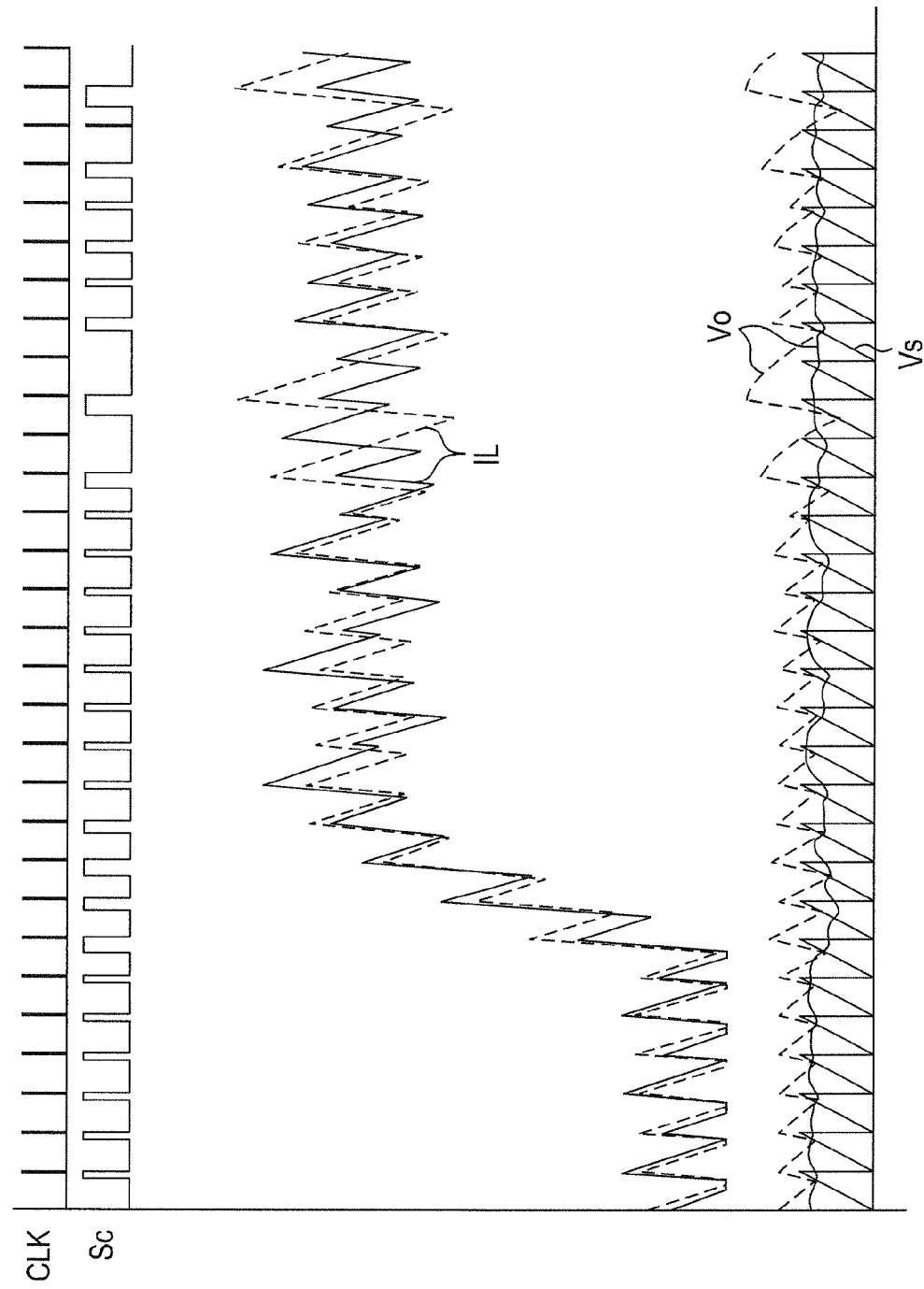
FIG. 4 is an operation waveform of the DC-DC converter illustrated in FIG. 1.

FIG. 4 illustrates results of simulation by a circuit that simplifies the DC-DC converter according to an embodiment. When a load current increases, the inductor current IL increases in response to the increase of the load current, and thereby the output voltage Vo decreases. As described above, the DC-DC converter according to the embodiment turns off the switch SW in a substantially constant cycle and changes the on-timing based on high and low levels of the output voltage Vo. Hence, the switch SW is turned off even when the load current is abruptly changed immediately after turning off the switch SW and exhibits high responsiveness.

Figure 2A:
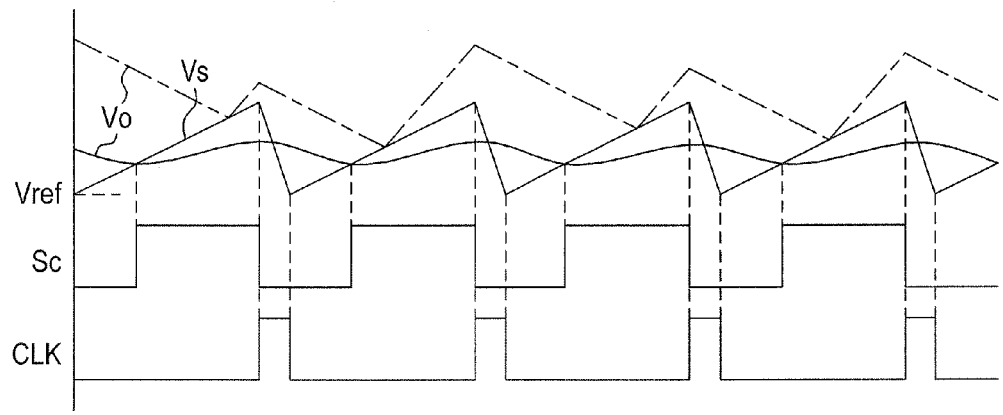
FIGS. 2A and 2B are a waveform diagram illustrating a basic operation of the DC-DC converter illustrated in FIG. 1.

In FIG. 4, the inductor current IL and the output voltage Vo are indicated by the solid line and the dashed line respectively. The solid line indicates a simulation result when the resistor R1 illustrated in FIG. 1, in other words, Equivalent Series Resistance (ESR) is 0Ω. The dashed line indicates a simulation result when ESR is 20 mΩ. The control signal Sc indicates a waveform when ESR is 20 mΩ. The waveform indicated by the long dashed short dashed line in FIG. 2A indicates an output voltage when ESR is high. The slope of the output voltage is greater than the slope of the reference voltage Vs. At this time, as illustrated in FIG. 4, an H level control signal Sc is not output within a switching cycle, and a skip of a switching cycle is caused. The example in FIG. 2 illustrates that the timing when the output voltage Vo crosses the reference voltage Vs substantially deviates, and a ripple of the output voltage becomes large. As described above, in the DC-DC converter according to the embodiment, when the value of ESR is small, ripples of the output voltage Vo and the inductor current IL are smaller and more stabilized.

In a conventional PFM method DC-DC converter, when the ESR value of a smoothing capacitor is smaller, the feedback system generally tends to be unstable. This is because the switching is operated by detecting ripple components included in the output voltage Vo, and when a capacitor with small ESR value is used as the smoothing capacitor C1, the ripple component becomes small and detecting changes in the output voltage Vo and the output current is difficult, and thereby controlling the switch becomes unstable.

However, the DC-DC converter according to the embodiment generates a reference voltage Vs by superimposing a slope voltage that rises and falls at each switching cycle of the switch SW onto the reference voltage Vref and determines the timing to turn on the switch SW by comparing the reference voltage Vs with the output voltage Vo. Hence, the DC-DC converter according to the embodiment does not detect ripple components due to the ESR of the output voltage Vo and operates switching stably even when the ESR value is small or when no ESR exists.

As a smoothing capacitor, generally an electro-conductive polymer capacitor or a laminated ceramic capacitor is used. The laminated ceramic capacitor is smaller and inexpensive compared with the electro-conductive polymer capacitor; however, the ESR value is smaller compared with that of the electro-conductive polymer capacitor. Thus, in conventional DC-DC converters, in some cases, a resistor is coupled in series to a laminated ceramic capacitor in order to achieve stabilization.

However, a smaller ESR value is desirable for the DC-DC converter according to the embodiment. Hence, using the laminated ceramic capacitor is preferable and miniaturization and cost reduction of the DC-DC converter may be achieved.

Figure 5:
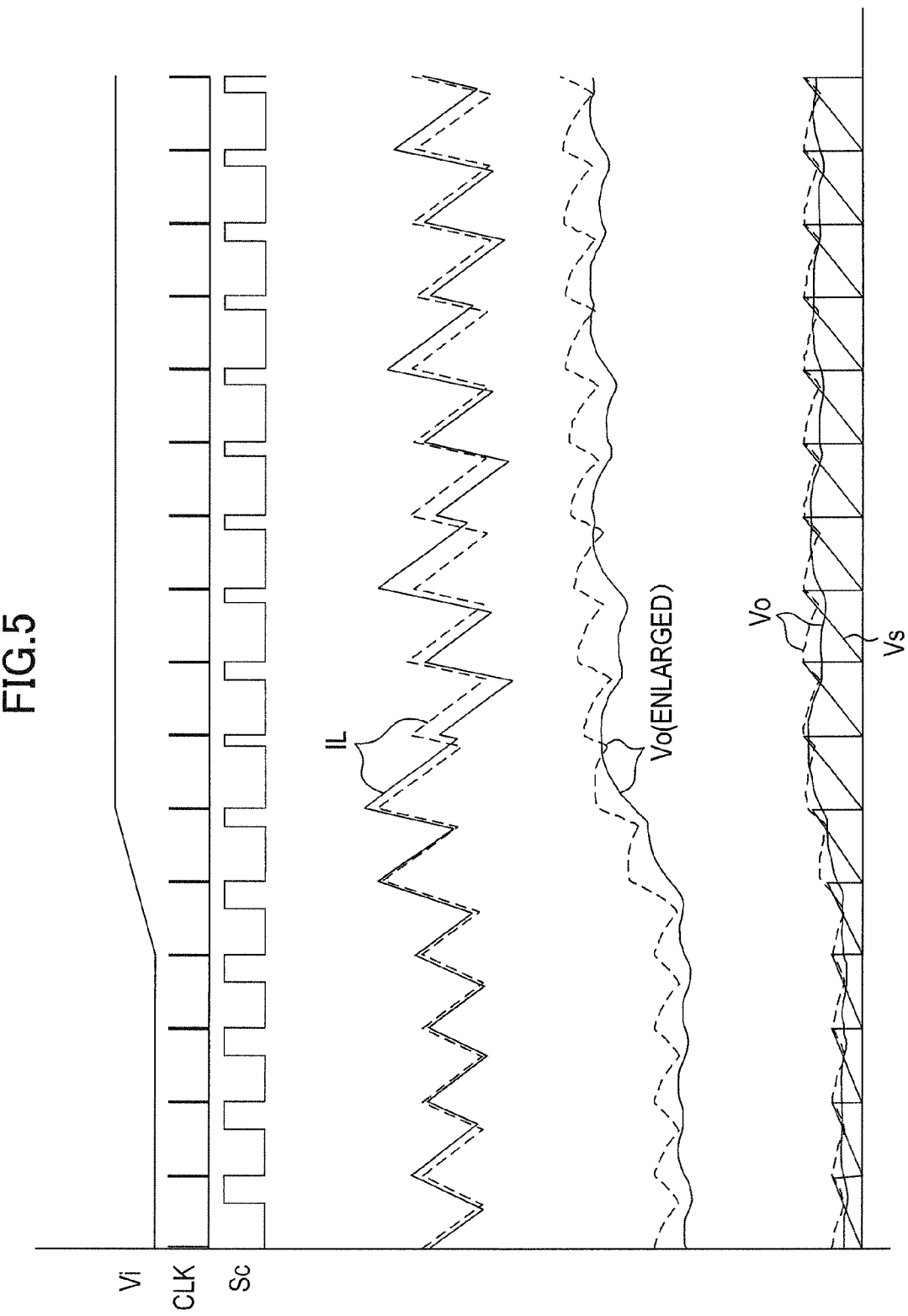
FIG. 5 is another operation waveform of the DC-DC converter illustrated in FIG. 1.

As described above, the slope signal generation circuit 22 illustrated in FIG. 3 generates an input current I0 according to a difference between the input voltage Vi and the output voltage Vo, and generates the current I1 by multiplying the current I0 by 1/n. The current I1 is charged to the capacitor C11 of the charge and discharge circuit 32 and generates a reference voltage Vs by superimposing a slope signal onto the reference voltage Vref. Hence, the control circuit 12 changes the height of the slope of the reference voltage Vs according to an input voltage Vi as illustrated in FIG. 5 when the input voltage Vi is changed.

As indicated by the long dashed short dashed line in FIG. 2A, the higher the input voltage Vi is, the steeper the slope of the output voltage Vo becomes. In other words, the higher the input voltage Vi is, a change amount per unit time of the output voltage Vo becomes larger. Therefore, maintaining the height of the slope of the reference voltage Vs substantially constant tends to cause skipping of the switching cycle and intermittent switching when the input voltage Vi is large or a difference of an input voltage and an output voltage is large. Accordingly, variations in peak values due to changes in the output voltage are caused.

Figure 2B:
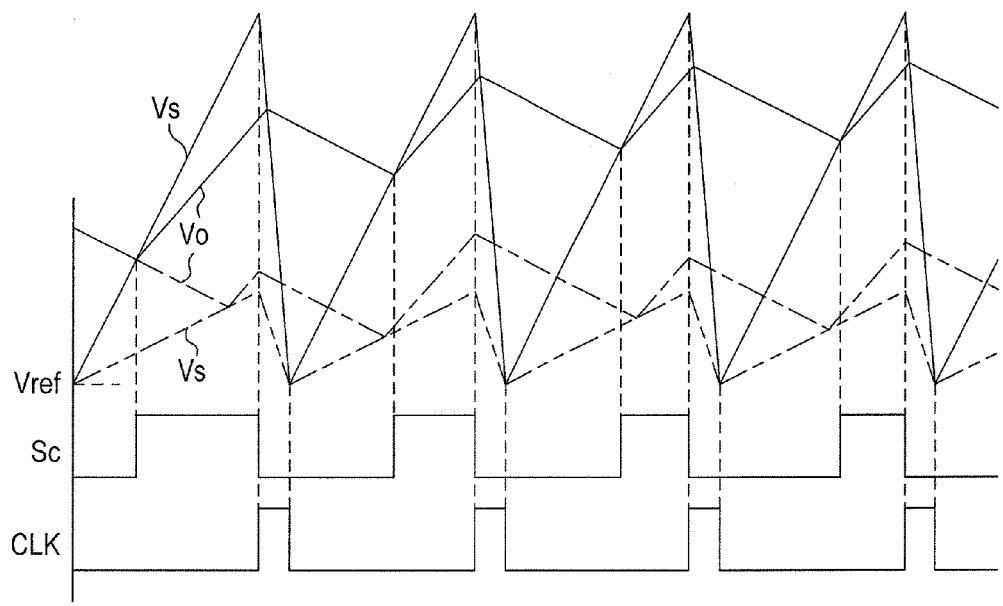

When an input voltage Vi is large or a voltage difference between an input voltage and an output voltage is large, skipping of a switching cycle and intermittent switching may be reduced if not prevented by making a change rate of a slope of the reference voltage Vs larger than the change rate of the slope of the output voltage as indicated by the solid lines in FIG. 2B, and variations in peak values due to changes in the output voltage Vo may be reduced if not prevented. In other words, a ratio of an increase and decrease of the output voltage is balanced in a switching cycle by increasing the slope even when a period to decrease the increased output voltage Vo is insufficient in a switching cycle. In FIG. 2B, the waveform of the output voltage Vo indicated by the long dashed short dashed line is substantially the same as that of the output voltage indicated by the long dashed short dashed line in FIG. 2A. The reference voltage Vs indicated by alternate long and two short dashes line is substantially the same as that of the reference voltage Vs in FIG. 2A.

The output voltage Vo may be varied within a range of a height of a slope, in other words, variations in an output voltage become large, thus, the lower height of the slope is preferable in order to reduce variations in the output voltage Vo when the input voltage Vi is small or a potential difference between the input voltage and the output voltage is small. As described above, the slope signal generation circuit 22 according to the embodiment adjusts the height of the slope according to a differential voltage of the input voltage Vi and the output voltage Vo. Therefore, as illustrated in FIG. 3, when an input voltage Vi is low, variations in the output voltage Vo are reduced by reducing the height of the slope, whereas the height of slope of the reference voltage Vs is made higher when the input voltage Vi is high, thereby allowing for reducing of not preventing the skipping of a switching cycle and intermittent switching to stabilize operation.

As described above, according to the embodiment, the following effects may be achieved.

The slope signal generation circuit 22 superimposes a slope voltage onto the reference voltage Vref to generate a reference voltage Vs. The comparator 21 compares the reference voltage Vs with the output voltage Vo and generates a signal S1 depending on the comparison result. The oscillator 24 generates a clock signal CLK with a substantially constant cycle. The RS-FF circuit 23 generates a control signal Sc so as to turn on the switch SW by an output signal S1 of the comparator 21, and generates a control signal Sc so as to turn off the switch SW by a clock signal CLK. In other words, the switch SW is turned off in a substantially constant cycle and changes the on-timing based on the result of comparison of the output voltage Vo and the reference voltage Vs. Accordingly, a high-speed response is achieved because an error amplifier is not required. Even immediately after the switch SW is turned off, the switch SW is turned on immediately when the output voltage Vo becomes lower than the reference voltage Vs, and immediately responds to a change of the load. This means that high-speed response is achieved for an abrupt change of the load. The effect becomes significant, when the input voltage Vi becomes two times larger than the output voltage Vo and the duty ratio is 50% or less.

Variations in switching frequencies are suppressed because the switch SW is turned off in a substantially constant cycle. As a result, noise measures may be taken easily.

A reference voltage Vs is generated by superimposing a slope signal onto the reference voltage Vref. Thus, a skip of a switching cycle and occurrence of a low frequency oscillation may be suppressed even when an on-time of the switch SW becomes extremely long for a change of a load current.

A resistance value of the ESR may be reduced by coupling the smoothing capacitor C1, therefore a laminated ceramic capacitor may be used as the capacitor C1 and miniaturization and cost reduction of the DC-DC converter may be achieved.

The slope signal generation circuit 22 adjusts the height of the slope of the reference voltage Vs according to a differential voltage of an input voltage Vi and an output voltage Vo. Thus, the height of the slope of the reference voltage Vs is suppressed when the input voltage Vi is low whereas the height of the slope of the reference voltage Vs is made higher when the input voltage Vi is high, thereby preventing skipping of a switching cycle to stabilize the operation (Second Embodiment)

Hereunder, a second embodiment will be described by referring to FIGS. 6 to 9. The same reference numerals are applied to the members etc. that are the same as those described in the first embodiment, and all or part of the explanation thereof will be omitted.

Figure 6:
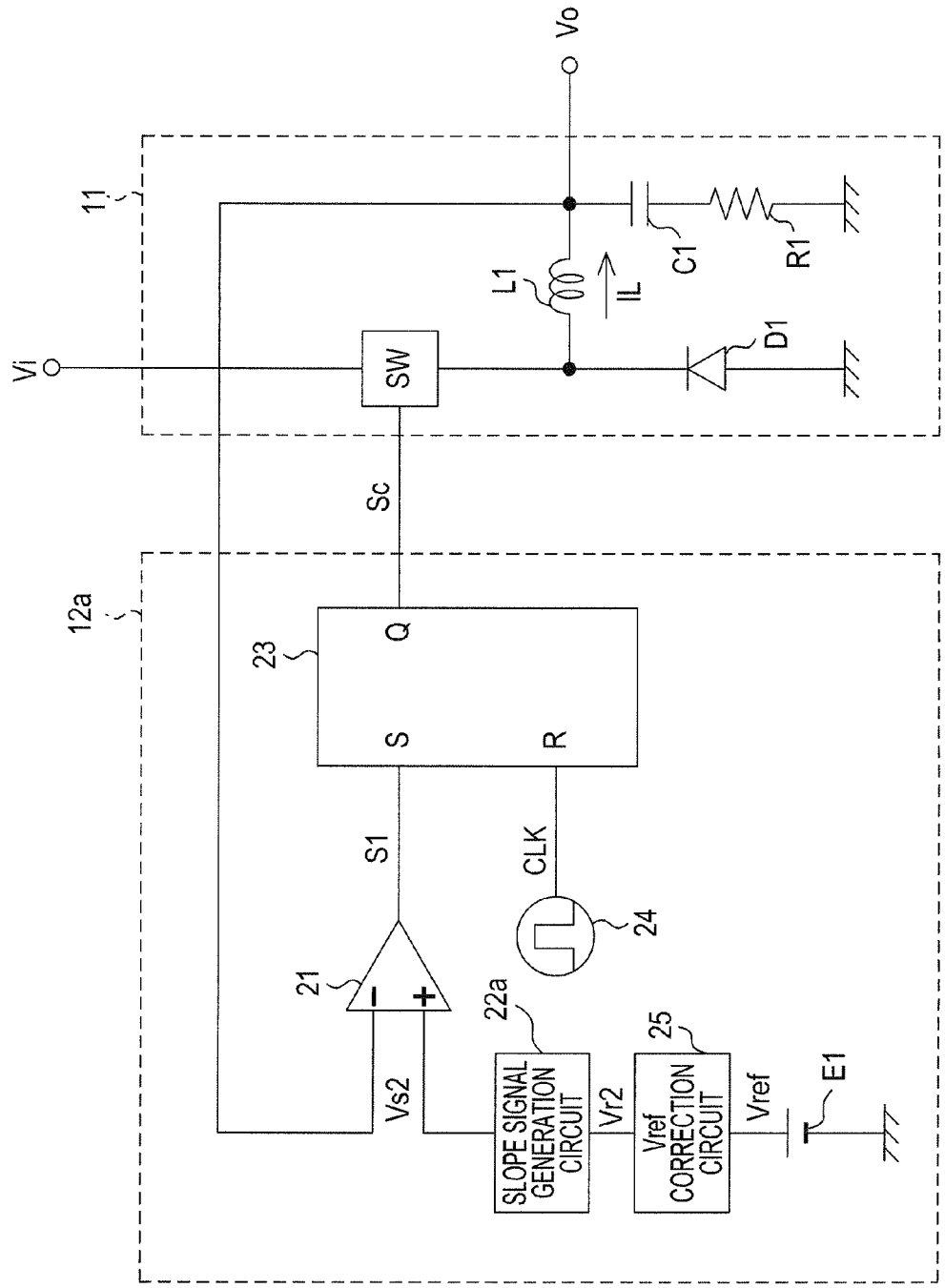
FIG. 6 is a block circuit diagram of a DC-DC converter according to a second embodiment.

As illustrated in FIG. 6, a DC-DC converter includes a converter unit 11 that generates an output voltage Vo based on an input voltage Vi and a control circuit 12a that controls the converter unit 11 based on an output voltage Vo.

The control circuit 12a includes a comparator 21, a slope signal generation circuit 22a, an RS-flip flop circuit (RS-FF circuit) 23, an oscillator 24, a reference supply E1, and a standard voltage correction circuit (Vref correction circuit: voltage correction circuit) 25.

The slope signal generation circuit 22a and the standard voltage correction circuit 25 are provided so as to suppress variations in the output voltage Vo due to a change of a duty ratio of a switch SW.

The standard voltage correction circuit 25 generates a corrected standard voltage Vr2 obtained by correcting a reference voltage Vref depending on a duty ratio of the switch SW and a differential voltage of an input voltage Vi and an output voltage Vo. The slope signal generation circuit 22a generates a reference voltage Vs2 with a sloped waveform assuming the corrected standard voltage Vr2 as a reset voltage. Hence, the reference voltage Vs2 is a voltage that is obtained by offsetting the reference voltage Vs assuming the reference voltage Vref as the reset voltage. The offset amount of the reference voltage Vs2 for the reference voltage Vs corresponds to a change amount of the output voltage Vo due to a duty ratio of the switch SW and the like. Therefore, the variations in the output voltage Vo may be suppressed by using the reference voltage Vs2.

Configurations of each of the circuits will be described.

Figure 7:
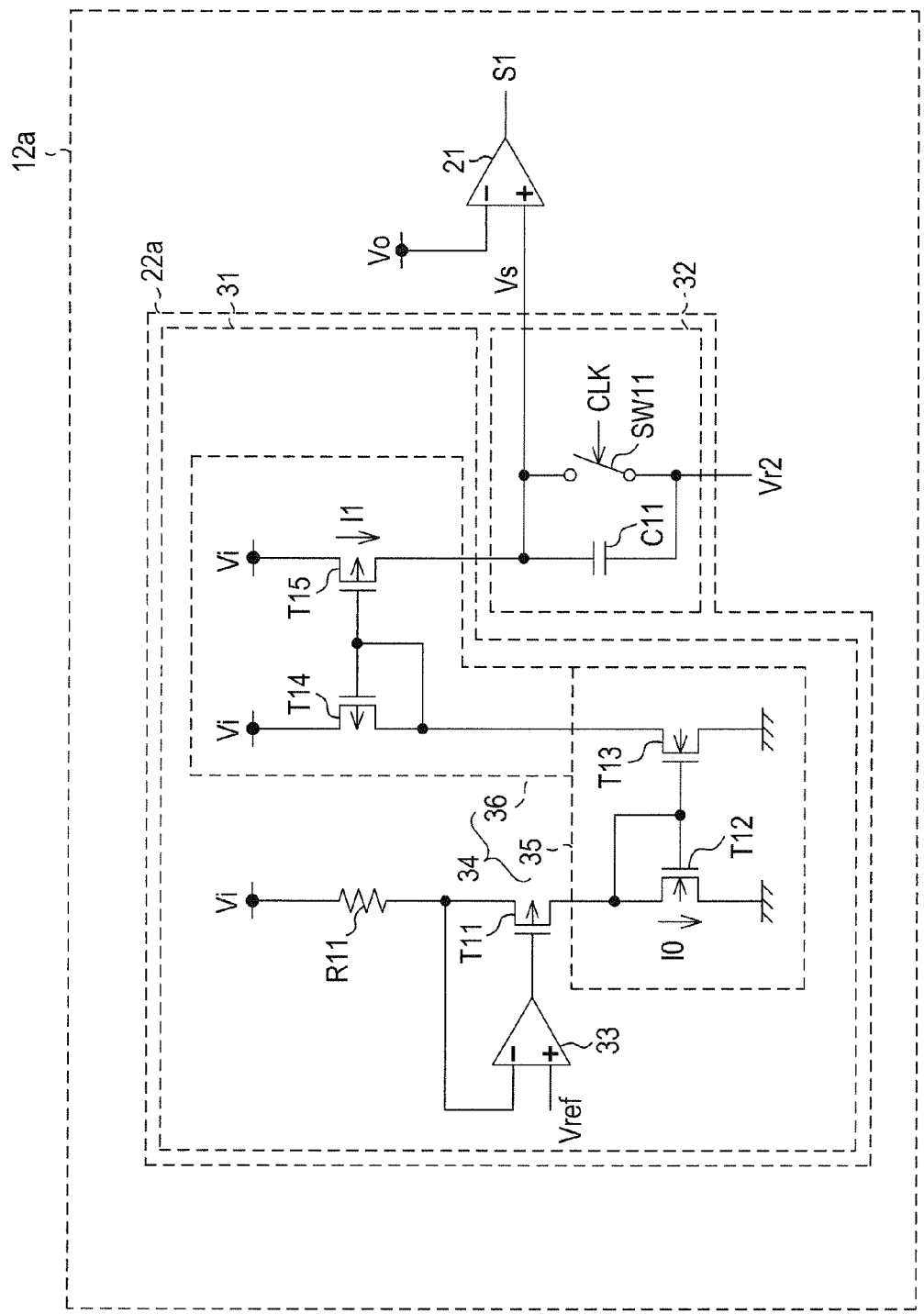
FIG. 7 is a circuit diagram of the slope signal generation circuit 22a illustrated in FIG. 6.

As illustrated in FIG. 7, differences between the slope signal generation circuit 22a according to the second embodiment and the slope signal generation circuit 22 according to the first embodiment are that the reference voltage Vref is supplied to a non-inverting input terminal of an operational amplifier 33 and the corrected standard voltage Vr2 is supplied to the capacitor C11.

As will be described later, the standard voltage correction circuit 25 generates a corrected standard voltage Vr2 that is reduced from the reference voltage Vref depending on, for example, a duty ratio of the switch SW. The reference voltage Vref is a substantially constant voltage that does not vary and has substantially the same potential as the output voltage Vo under normal operation, however ripple components exist in the output voltage Vo. Thus, by generating a current I0 and a current I1 using the reference voltage Vref instead of the output voltage Vo, stable currents without including variations in the output voltage Vo may be generated and thereby a stable reference voltage Vs2 may be generated.

Figure 8:
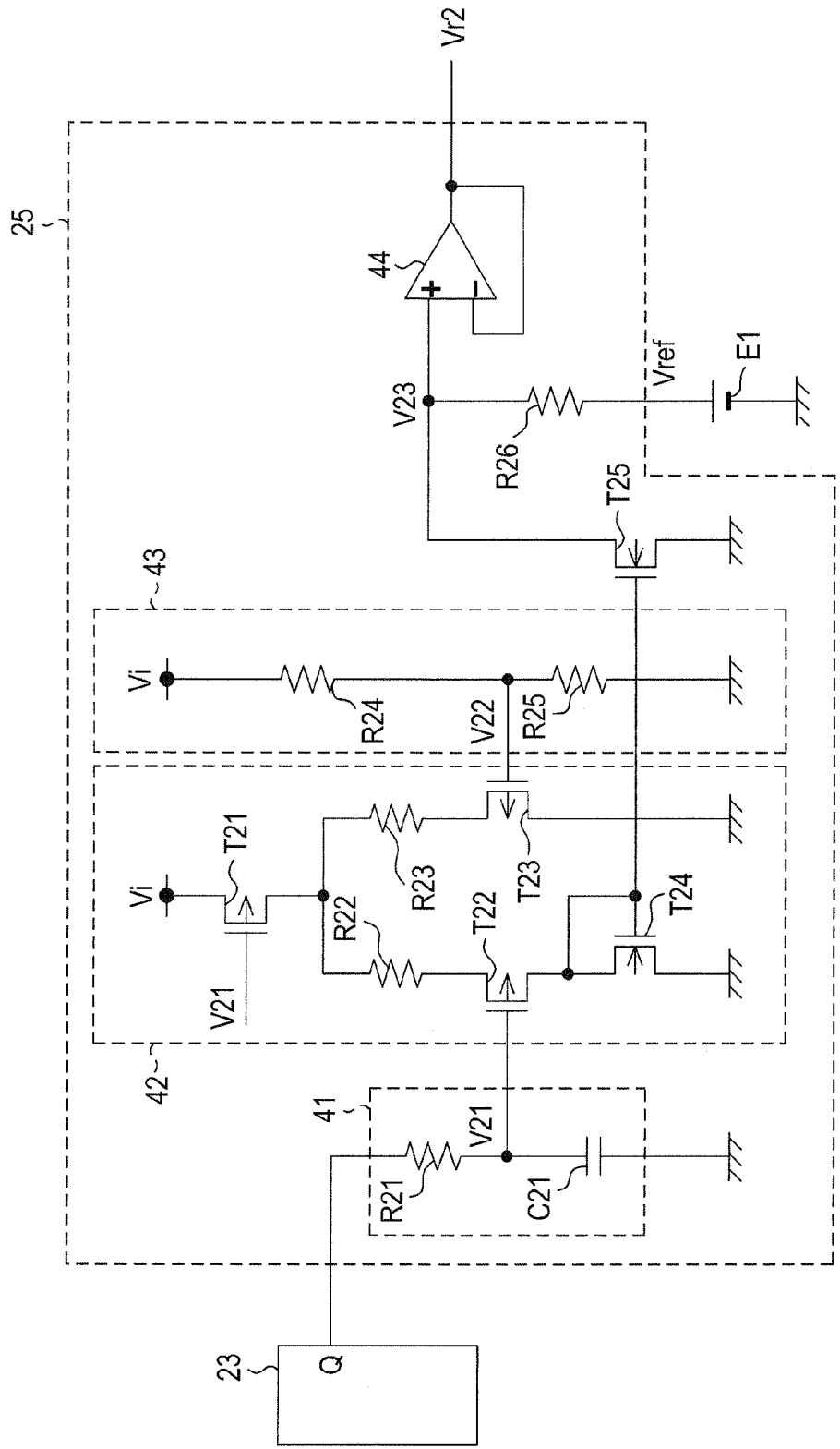
FIG. 8 is a circuit diagram of the control circuit 12a illustrated in FIG. 6.

As illustrated in FIG. 8, the standard voltage correction circuit 25 includes a duty conversion circuit 41, a differential circuit 42, a standard voltage generation circuit 43, and an operational amplifier 44.

The duty conversion circuit 41 converts an on-duty of the switch SW illustrated in FIG. 6 to a voltage. The duty conversion circuit 41 is, for example, a low-pass filter that includes a resistor R21 and a capacitor C21. A first terminal of the resistor R21 is coupled to an output terminal Q of the RS-FF circuit 23, a second terminal of the resistor R21 is coupled to a first terminal of the capacitor C21, and a second terminal of the capacitor C21 is coupled to a ground. In other words, the resistor R21 and the capacitor C21 are coupled in series between the output terminal Q of the RS-FF circuit 23 and the ground. The duty conversion circuit 41 smoothes a control signal Sc output from the RS-FF circuit 23. Thus, a voltage V21 at a coupling point between the resistor R21 and the capacitor C21 is a voltage according to a duty ratio of the control signal Sc. In other words, the duty conversion circuit 41 converts an on-duty of the control signal Sc that is an on-duty of the switch SW illustrated in FIG. 6 to a voltage V21. The voltage V21 is supplied to the differential circuit 42.

The differential circuit 42 includes transistors T21 to T24 and resistors R22 and R23. The transistors T21 to T23 are p-channel MOS transistors, while the transistor T24 is an n-channel MOS transistor. An input voltage Vi is supplied to a source of the transistor T21, and a gate of the transistor T21 is coupled to a gate of the transistor T14 illustrated in FIG. 7. The transistor T21 is substantially the same size as the transistor T14, and has substantially the same electric characteristics. Hence, the transistor T21 applies a current I2 that is substantially the same as the current I1 that flows through the transistor T15 illustrated in FIG. 7. As described above, a current value of the current I2 corresponds to a differential voltage of the input voltage Vi and the reference voltage Vref (output voltage Vo).

First terminals of the resistors R22 and R23 are coupled to a drain of the transistor T21. A second terminal of the resistor R22 is coupled to a source of the transistor T22. A gate of the transistor T22 is coupled to a coupling point between the resistor R21 and the capacitor C21 of the duty conversion circuit 41, and a voltage V21 at the coupling point is supplied to the gate of the transistor T22. A drain of the transistor T22 is coupled to a drain of the transistor T24 and a source of the transistor T23 is coupled to a ground. A gate of the transistor T24 is coupled to a drain of the transistor T24. A second terminal of the resistor R23 is coupled to a source of the transistor T23. A source of the transistor T23 is coupled to a ground and a gate of the transistor T23 is coupled to the standard voltage generation circuit 43.

The standard voltage generation circuit 43 generates a standard voltage according to a standard duty in the switch SW illustrated in FIG. 6. The standard voltage generation circuit 43 includes resistors R24 and R25. The resistors R24 and R25 are coupled in series between a power line of the input voltage Vi and a power line of a ground. The resistance values of the resistors R24 and R25 are set according to the standard voltage. Both the resistors R24 and R25 divide a potential difference between the input voltage Vi and the ground according to respective resistance values and generate a standard voltage.

The standard duty is set according to a range of on-duty of the switch SW, and may be set, for example, to 50%. An H level control signal Sc is a power supply voltage at a high potential side supplied to the RS-FF circuit 23, in other words, an input voltage Vi level, and an L level control signal Sc is a power supply voltage of a low potential side supplied to the RS-FF circuit 23, in other words, a ground level. Hence, a voltage that corresponds to 50% is half of the input voltage Vi. Therefore, resistance values of both resistors R24 and R25 are set to substantially the same value. The standard voltage generation circuit 43 supplies a voltage generated between the both resistors R24 and R25 to the differential circuit 42 as a standard voltage V22.

The differential circuit 42 shunts the current I2 that flows through the transistor T21 into a route in which the resistor R22, the transistors T22 and T24 are coupled in series, and into another route in which the resistor R23 and the transistor T23 are coupled in series. A voltage V 21 according to the on-duty of the switch SW is supplied to the gate of the transistor T22 and the standard voltage V22 is supplied to the gate of the transistor T23. The transistors T22 and T23 both function as resistive elements with resistance values according to the voltages V21 and V22 supplied to respective gates.

Therefore, currents that are substantially the same values flows through the transistors T22 and T23 when values of gate voltages of the transistors T22 and T23 are substantially the same. Currents according to differential voltages of the gate voltages of the transistors T22 and T23 flow through the transistors T22 and T23 respectively.

The gate of the transistor T24 is coupled to a gate of the transistor T25 as a potential difference generation circuit. The transistor T25 is an n-channel MOS transistor and a source of the transistor T25 is coupled to a ground. The transistor T25 is substantially the same size as the transistor T24, and has substantially the same electric characteristics. Therefore a current that flows through the transistor T24 is mirrored to the transistor T25 by a current mirror circuit that includes the transistor T24 and the transistor T25. The current amount that flows through the transistor T24 corresponds to a difference of gate voltages of the transistors T22 and T23, and a current amount of the transistor T21 that supplies currents to both transistors T22 and T23. Hence, the transistor T25 applies a current according to a differential voltage (difference of the input and output voltages) between the input voltage Vi and the reference voltage Vref (output voltage Vo), and on-duty of the switch SW.

A drain of the transistor T25 is coupled to a plus terminal of the reference supply E1 through the resistor R26. The drain of the transistor T25 is coupled to a non-inverting input terminal of the operational amplifier 44. An inverting input terminal of the operational amplifier 44 is coupled to an output terminal of the operational amplifier 44 and provides a function of a buffer amplifier.

The transistor T25 applies a current according to a difference between an input voltage and an output voltage, and on-duty, thus a potential difference according to the on-duty is generated between both terminals of the resistor R26. The resistor R26 is coupled between the transistor T25 and the reference supply E1. The transistor T25 applies a current from the reference supply E1 to the ground. Therefore, a voltage drop from the reference voltage Vref according to the difference between the input voltage and the output voltage, and the on-duty of the switch SW is caused in the resistor R25. Hence, a potential of a node between the resistor R25 and the transistor T25 is a potential that is decreased from the reference voltage Vref for the amount of the voltage drop caused in the resistor R25. The operational amplifier 44 outputs a corrected standard voltage Vr2 that is substantially equivalent to the voltage of the node.

As described above, the standard voltage correction circuit 25 generates a corrected standard voltage Vr2 obtained by correcting the reference voltage Vref according to a difference between an input voltage and an output voltage, and on-duty. The slope signal generation circuit 22a generates a reference voltage Vs2 onto which a slope voltage is superimposed assuming the corrected standard voltage Vr2 as a reset voltage.

An operation of the above-configured DC-DC converter will be described.

Duty of the switch SW, in other words, amplitude of the slope signal (slope gradient) is changed depending on an input voltage Vi in order to obtain a desired output voltage Vo when an input voltage Vi changes or an input voltage Vi that is different from a given value is supplied to the DC-DC converter. In a configuration in which a slope signal is superimposed onto a reference voltage Vref, when the comparator 21 inverts an output signal (outputs an H level signal S1) according to a gradient of the slope signal, a voltage supplied to an input terminal of the comparator 21, in other words, an output voltage Vo slightly changes due to a difference of the slope amount. Accordingly, it is desirable that variations in the output voltage Vo for the input voltage Vi be reduced by changing a reset voltage of the charge and discharge circuit 32 depending on the input voltage Vi.

Figure 9:
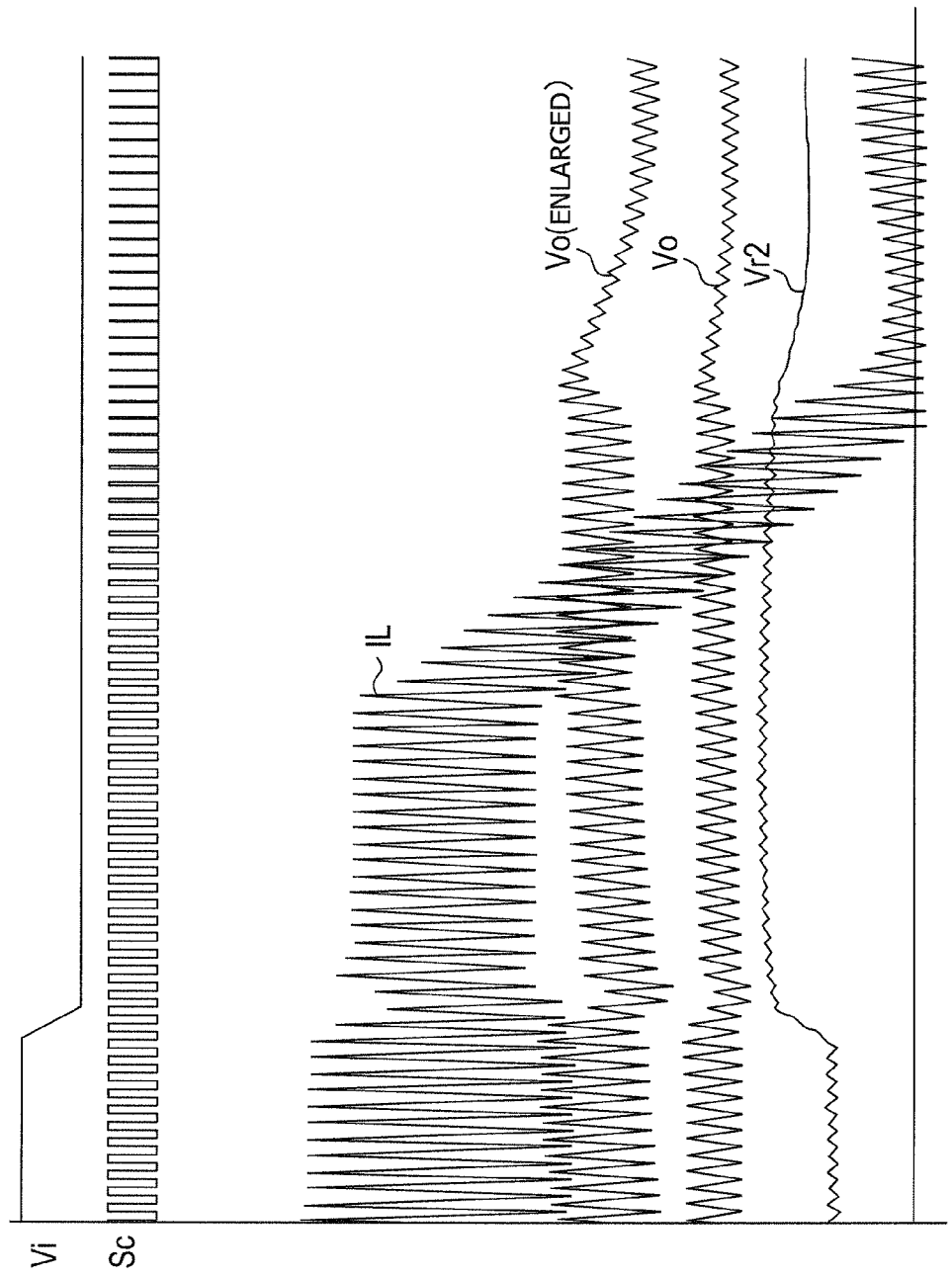
FIG. 9 is an operation waveform the DC-DC converter illustrated in FIG. 6.

As illustrated in FIG. 9, the standard voltage correction circuit 25 increases the corrected standard voltage Vr2 according to an input voltage Vi when the input voltage Vi decreases. At this time, the slope signal generation circuit 22a decreases the amplitude of a slope signal to be generated based on the input voltage Vi. The above described operations maintain a voltage where an output voltage Vo that is input to the comparator 21 crosses the reference voltage Vs substantially constant. As a result, the control circuit 12a stabilizes an output voltage Vo to a substantially constant value.

A pulse width of the control signal Sc changes when the inductor current IL decreases by a decrease of a load and turns into a discontinuous mode in which the inductor current IL temporarily becomes 0. The corrected standard voltage Vr2 decreases due to the pulse width change. As a result, a voltage where an output voltage Vo that is input to the comparator 21 crosses the reference voltage Vs is maintained to a substantially constant value and an output voltage Vo is stabilized to a substantially constant value.

The standard voltage correction circuit 25 may generate a corrected standard voltage Vr2 according to a change amount of a slope amount (slope gradient) that is controlled according to an input voltage or a differential voltage of an input voltage and an output voltage. For example, as illustrated in FIG. 2, a reference voltage Vref may be changed according to an input voltage Vi or a voltage difference of an input voltage and an output voltage when a slope gradient is changed according to the input voltage Vi or the differential voltage of the input voltage and the output voltage. For example, the reference voltage Vref may be decreased when an input voltage is large or a voltage difference between an input voltage and an output voltage is large, or the reference voltage Vref may be increased when an input voltage Vi is small or a voltage difference between an input voltage and an output voltage is small. By applying the above described controls, absolute values of output voltages may be substantially the same before and after changing the slope amount (slope gradient).

As described above, according to the embodiment, the following effects may be achieved.

The control circuit 12a generates a corrected standard voltage Vr2 that is obtained by correcting the reference voltage Vref according to a duty ratio of the switch SW, and a differential voltage of an input voltage Vi and an output voltage Vo, and generates a reference voltage Vs2 with a sloped waveform assuming the corrected standard voltage Vr2 as a reset voltage. Thus, the reference voltage Vs2 is a voltage that offsets the reference voltage Vs assuming the reference voltage Vref as a reset voltage, and the offset amount of the reference voltage Vs2 for the reference voltage Vs corresponds to a change amount of an output voltage Vo due to, for example, a duty ratio of the switch SW. Hence, using the reference voltage Vs2 may suppress variations in the output voltage Vo.

Using the reference voltage Vref instead of the output voltage Vo may generate the current I0 and I1 that do not include variations in the output voltage Vo, in other words, generate a stable current, and consequently generate a stable reference voltage Vs2.

(Third Embodiment)

Hereunder, a third embodiment will be described by referring to FIG. 10. The same reference numerals are applied to the members etc. that are the same as those described in the above embodiments, and all or part of the explanation thereof will be omitted.

Figure 10:
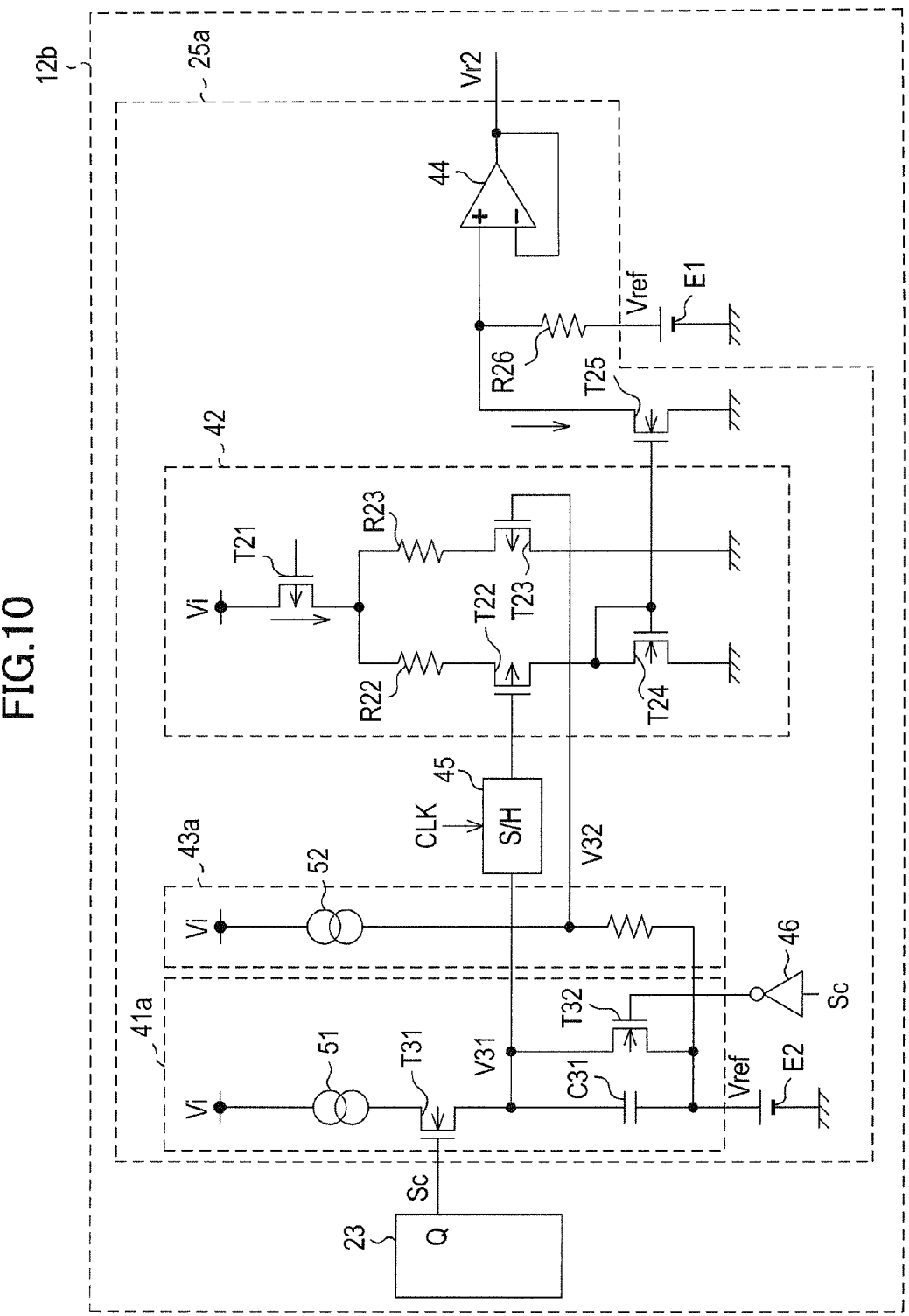
FIG. 10 is a circuit diagram of the DC-DC converter according to a third embodiment.

FIG. 10 is a circuit diagram of a control circuit 12b according to the third embodiment. The control circuit 12b may be used in place of the control circuit of the above described each of the embodiments.

The control circuit 12b includes an RS-flip flop circuit (RS-FF circuit) 23, a reference supply E1, and a standard voltage correction circuit (Vref correction circuit) 25a. The control circuit 12b includes a comparator 21, a slope signal generation circuit 22a, and an oscillator 24 as in the control circuit 12a according to the second embodiment (refer to FIG. 6), although the elements are not illustrated.

The standard voltage correction circuit 25a includes a duty conversion circuit 41a, a differential circuit 42, a standard voltage generation circuit 43a, an operational amplifier 44, a sample hold circuit (S/H) 45, and an inverter circuit 46.

The duty conversion circuit 41a converts on-duty of the switch SW (refer to FIGS. 1 and 6) into a voltage, as in the second embodiment. The standard voltage generation circuit 43a generates a standard voltage according to a standard duty in the switch SW.

The duty conversion circuit 41a includes a constant current source 51, a transistor T31, a transistor T32, and a capacitor 31. The constant current source 51 is supplied with an input voltage Vi and supplies a substantially constant current to the transistor T31. The transistor T31 is an n-channel MOS transistor. A drain of the transistor T31 is coupled to the constant current source 51, a source of which is coupled to a first terminal of the capacitor C31, and a gate of which is supplied with a control signal SC. A second terminal of the capacitor C31 is coupled to a plus terminal of a reference supply E2, and a minus terminal of the reference supply E2 is coupled to a ground. The transistor T32 is coupled in parallel with the capacitor C31. The transistor T32 is an n-channel MOS transistor and a source and a drain of which are coupled to both terminals of the capacitor C31 respectively. A gate of the transistor T32 is coupled to an output terminal of an inverter circuit 46 and a signal that is the control signal Sc logically inverted by the inverter circuit 46 is supplied to the gate of the transistor T32.

The transistor T31 supplies a current that the constant current source 51 applies during an on period of the switch SW (refer to FIGS. 1 and 6) to the capacitor C31 according to the control signal Sc and stops supplying current during an off period of the switch SW. The transistor T32 opens both terminals of the capacitor C31 during the on period of the switch SW according to the inverted control signal Sc and short-circuits between both terminals of the capacitor 31 during the off-period of the switch SW. The reference supply E1 supplies a reference voltage Vref to the second terminal of the capacitor C31.

Thus, a voltage at the first terminal of the capacitor C31 rises from the reference voltage Vref as time elapses during the on-period of the switch SW, and resets to the reference voltage Vref during the off-period of the switch SW. A current amount of the constant current source 51 determines a change amount (gradient) of a voltage at the first terminal of the capacitor C31.

A voltage V31 between the capacitor C31 and the transistor T31 is supplied to the sample hold circuit 45. The sample hold circuit 45 responds to an H level clock signal CLK and retains the supplied voltage. As described above, the RS-FF circuit 23 resets the control signal Sc in response to the H level clock signal CLK, in other words, outputs an L level control signal Sc.

Hence, the sample hold circuit 45 retains the charging voltage V31 of the capacitor C31 when the switch SW is turned off in response to the L level control signal Sc. The charging voltage V31 of the capacitor C31 gradually increases from the reference voltage Vref while the switch SW is turned on and resets to the reference voltage Vref when the switch SW is turned off. Thus, the charging voltage V31 of the capacitor C31 corresponds to a period during which the switch SW is turned on. In other words, the sample hold circuit 45 retains a charging voltage V31 according to an on-duty of the switch SW. The sample hold circuit 45 supplies the retained voltage (duty voltage) to the differential circuit 42.

A standard voltage generation circuit 43a includes a constant current source 52 and a resistor R31. The constant current source 52 is supplied with an input voltage Vi and supplies a substantially constant current to the resistor R31. A first terminal of the resistor R31 is coupled to the constant current source 52 and a second terminal of the resistor R31 is coupled to the plus terminal of the reference supply E2. Thus, a voltage V32 at a coupling point between the constant current source 52 and the resistor R31 is a voltage that is higher than the reference voltage Vref for the amount of the voltage between the both terminals of the resistor 31. The voltage between both terminals of the resistor R31 is determined by a resistance value of the resistor R31 and a current amount that the constant current source 52 supplies to the resistor R31. The resistance value of the resistor R31 and the current amount of the constant current source 52 is set to a value that corresponds to the standard duty (for example, 50%), as in the second embodiment. A voltage V32 generated by the standard voltage generation circuit 43a is supplied to the transistor T23 of the differential circuit 42.

Therefore, the voltage V31 according to the on-duty of the switch SW is supplied to a gate of the transistor T22 and the voltage V32 according to the standard duty is supplied to a gate of the transistor T23 in the differential circuit 42. The differential circuit 42 applies a current to the transistor T24 according to a difference between an input voltage and an output voltage and on-duty as in the second embodiment. A current I3 that corresponds to a current that flows through the transistor T24 flows through the transistor T25. Hence, the standard voltage correction circuit 25a generates a corrected standard voltage Vr2 obtained by correcting a reference voltage Vref according to a difference between an input voltage and an output voltage Vo, and the on-duty.

As described above, according to the embodiment, the following effects may be achieved.

The voltage V31 according to on-duty of the switch SW is generated by charging and discharging the capacitor C31. The voltage V31 is retained by the sample hold circuit 45. A current obtained by shunting a current I21 according to a differential voltage of an input voltage Vi and an output voltage Vo is changed based on the retained voltage and the voltage V32 according to the standard duty. A potential difference is caused at both terminals of a resistor 26 by the changed current to generate a corrected standard voltage Vr2 obtained by correcting a reference voltage Vref according to a difference between an input voltage and an output voltage, and the duty of the switch SW. As a result, as in the second embodiment, variations in an output voltage Vo may be suppressed. A change of the duty may be immediately responded by removing the low-pass filter according to the second embodiment.

(Fourth Embodiment)

Hereunder, a fourth embodiment will be described by referring to FIG. 11. The same reference numerals are applied to the members etc. that are the same as those described in the above embodiments, and all or part of the explanation thereof will be omitted.

Figure 11:
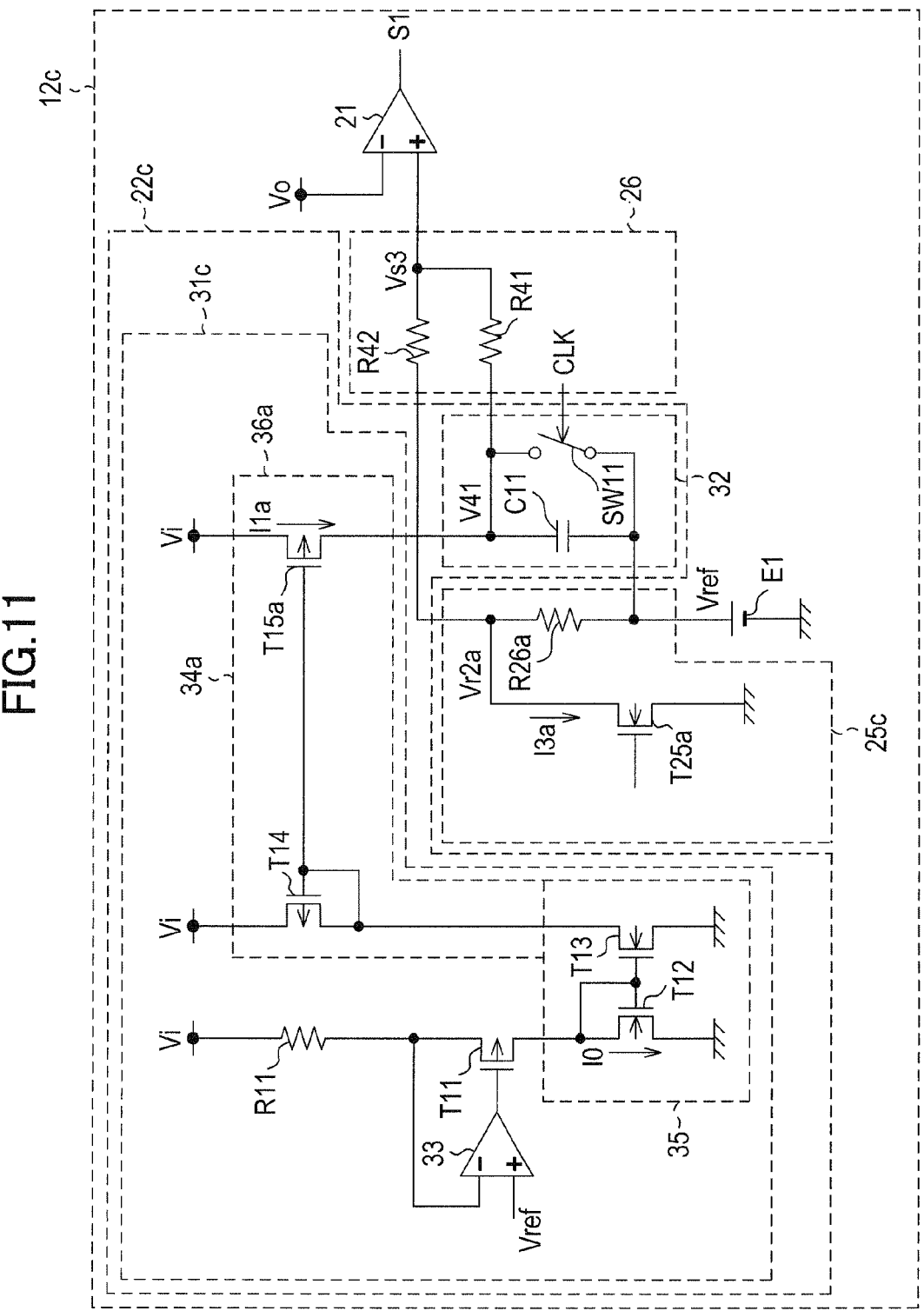
FIG. 11 is a circuit diagram of the DC-DC converter according to a fourth embodiment.

FIG. 11 is a diagram of a part of a control circuit 12c according to the fourth embodiment. The control circuit 12c may be used in place of the control circuit of the above described each of the embodiments.

The control circuit 12c includes a comparator 21, a slope signal generation circuit 22c, a reference supply E1, a standard voltage correction circuit (Vref correction circuit) 25c, and a signal synthesis circuit 26. The control circuit 12c includes an RS-flip flop circuit (RS-FF circuit) 23, and an oscillator 24 (refer to FIG. 6) as in the control circuit 12a according to the second embodiment, although the elements are not illustrated.

The slope signal generation circuit 22c includes a current generation circuit 31c and a charge and discharge circuit 32.

The current generation circuit 31c generates a current for generating a slope signal. The charge and discharge circuit 32 operates assuming a reference voltage Vref as a reference level and generates a reference voltage Vs3 obtained by superimposing the slope signal (slope voltage) onto the reference voltage Vref by charging and discharging currents generated by the current generation circuit 31c.

The current generation circuit 31c includes an operational amplifier 33, a current mirror circuit 34a, a resistor R11, and a transistor T11.

According to the fourth embodiment, a reference voltage Vref is supplied to a non-inverting input terminal of the operational amplifier 33. The operational amplifier 33 generates a gate voltage of the transistor T11 so that a node voltage between the resistor R11 and the transistor T11 is substantially the same as the reference voltage Vref. The current mirror circuit 34a includes a first current mirror circuit 35 and a second current mirror circuit 36a. The current mirror circuit 36a according to the fourth embodiment includes a pair of transistors T14 and T15a. The transistor T15a is formed so as to apply a current I1a that is substantially two times as large as a current amount of the transistor T14. The current I1a is supplied to the charge and discharge circuit 32.

A reference voltage Vref is supplied to the charge and discharge circuit 32. In other words, the capacitor C11 and the switch SW11 in the charge and discharge circuit 32 are coupled to a plus terminal of the reference supply E1. Hence, the slope signal generation circuit 22a generates a voltage V41 (slope voltage) that rises during an on-period of the switch SW assuming the reference voltage Vref as a reset voltage and that resets to the reference voltage Vref during an off-period of the switch SW assuming the reference voltage Vref as a reset voltage. A current amount of the current I1a supplied to the capacitor C11 is, for example, "n" times (for example, two times) the current I1 according to the first embodiment (refer to FIG. 3). Therefore, amplitude of a voltage V41 of the slope signal generated by the capacitor C11 is substantially two times the amplitude of the slope signal of the first embodiment.

The standard voltage correction circuit 25c includes a transistor T25a and a resistor R26a illustrated in FIG. 11, a duty conversion circuit 41, a differential circuit 42, a standard voltage generation circuit 43, and an operational amplifier 44 as illustrated in FIG. 8.

The standard voltage correction circuit 25c generates a corrected standard voltage Vr2a obtained by correcting the reference voltage Vref according to a difference between an input voltage and an output voltage, and on-duty. According to the embodiment, the standard voltage correction circuit 25c causes a potential difference between both terminals of the resistor R26a that is "n" times (for example, two times) of the voltage between the both terminals of the resistor R26 according to the second embodiment. For example, the transistor T25a is formed so as to apply half of a current I3a of the transistor T25 according to the second embodiment (refer to FIG. 8) and a resistance value of the resistor R26a is four times the resistance value of the resistor R26 according to the second embodiment. The corrected standard voltage Vr2a obtained by correcting the reference voltage Vref is generated by the potential difference between the both terminals of the resistor R26. The corrected standard voltage Vr2a is a voltage that is obtained by decreasing the reference voltage Vref.

The signal synthesis circuit 26 generates a reference voltage Vs3 by synthesizing the voltage V41 generated by the slope signal generation circuit 22a and the corrected standard voltage Vr2a generated by the standard voltage correction circuit 25c. For example, the signal synthesis circuit 26 includes two resistors R41 and R42. The voltage V41 is supplied to a first terminal of the resistor R41 and the corrected standard voltage Vr2 is supplied to a first terminal of the resistor R42. Second terminals of both resistors R41 and R42 are coupled each other and the coupling point is coupled to a non-inverting input terminal of the comparator 21.

According to the embodiment, resistance values of the resistors R41 and R42 are set depending on a mixed ratio of the slope voltage V41 and the corrected standard voltage Vr2a. As described above, in current I1a and I3a, respective voltages are doubled because the current amounts of the currents I1a and I3a are set to be doubled. Accordingly, resistance values of the resistors R41 and R42 are set to the substantially the same value. A ratio of the resistance value of the resistor R41 and the resistance value of the resistor R42 is set to (n-1):1 when the current I1a and I3a are set to "n" times.

The resistors R41 and R42, which are coupled and the resistance values of which are set as described above, generate a divided voltage at the coupling point of the resistors R41 and R42 that is obtained by dividing a potential difference between the slope voltage V41 and the corrected standard voltage Vr2a by a ratio of resistance values of the resistor R41 and the resistor R42. As described above, according to the embodiment, resistance values of both resistors R41 and R42 are set to substantially the same value. Thus, the signal synthesis circuit 26 generates a voltage that is obtained by multiplying, by ½, the potential difference between the slope voltage V41 and the corrected standard voltage Vr2a as the reference voltage Vs3. The slope voltage V41 is a voltage that is two times higher than the reference voltage Vref of the slope voltage, and the corrected standard voltage Vr2a is a voltage that is two times lower than the reference voltage Vref of the corrected voltage. Therefore, the reference voltage Vs3 is higher than a reset voltage by the amount of one times the slope voltage assuming the reset voltage is lower than the reference voltage Vref by the amount of one times the corrected voltage.

As described above, according to the embodiment, the following effects may be achieved.

A slope voltage V41 is generated assuming the reference voltage Vref as a reset voltage in the slope signal generation circuit 22c, and a corrected standard voltage Vr2a that is lower than the reference voltage Vref is generated in the standard voltage correction circuit 25c. The signal synthesis circuit 26 generates a reference voltage Vs3 by synthesizing the voltage V41 and the corrected standard voltage Vr2a. The potential of the synthesized result of the reference voltage Vs3 is substantially the same as the reference voltage Vs assuming the corrected standard voltage Vr2 according to the third embodiment as a reset voltage. According to the present embodiment, the operational amplifier 44 may be removed by providing the standard voltage correction circuit in parallel with the slope signal generation circuit, which are coupled in series in FIG. 6, and by synthesizing voltages generated by each of the standard voltage correction circuit and the slope signal generation circuit.

(Fifth Embodiment)

Figure 13:
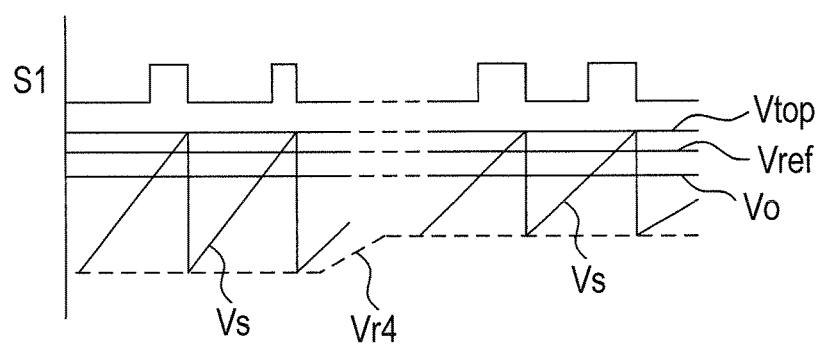
FIG. 13 is an operation of the control circuit illustrated in FIG. 12.
Figure 14:
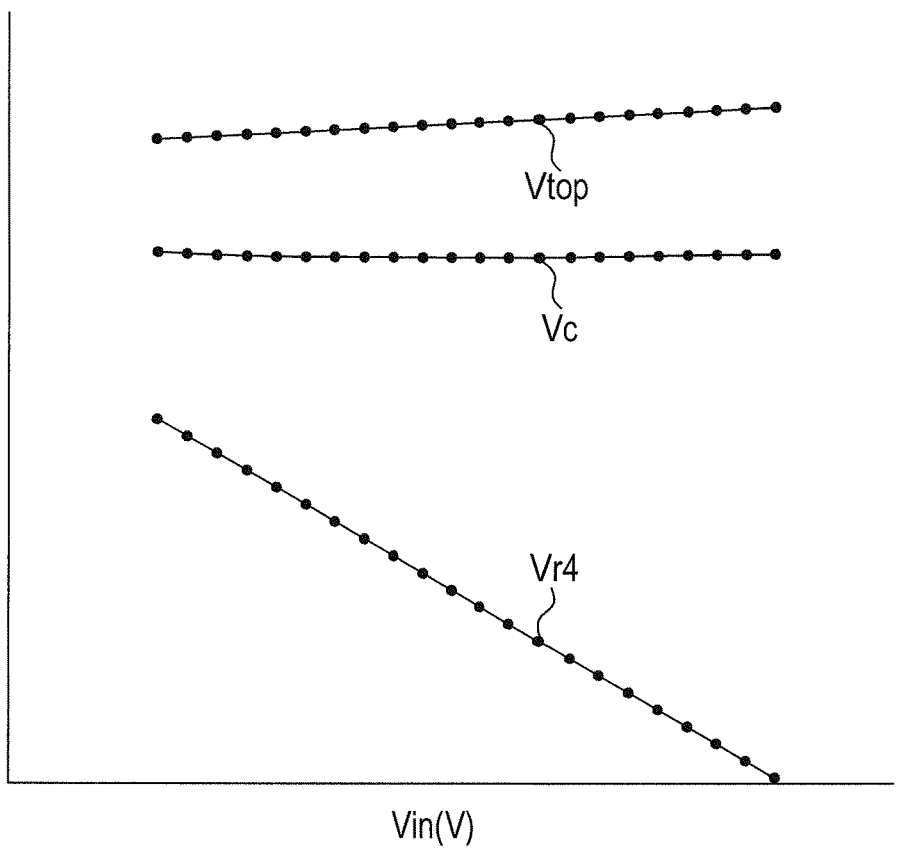
FIG. 14 is a characteristic chart illustrating an operation of the control circuit illustrated in FIG. 12.

Hereunder, a fifth embodiment will be described by referring to FIGS. 12 to 14. The same reference numerals are applied to the members etc. that are the same as those described in the above embodiments, and all or part of the explanation thereof will be omitted.

Figure 12:
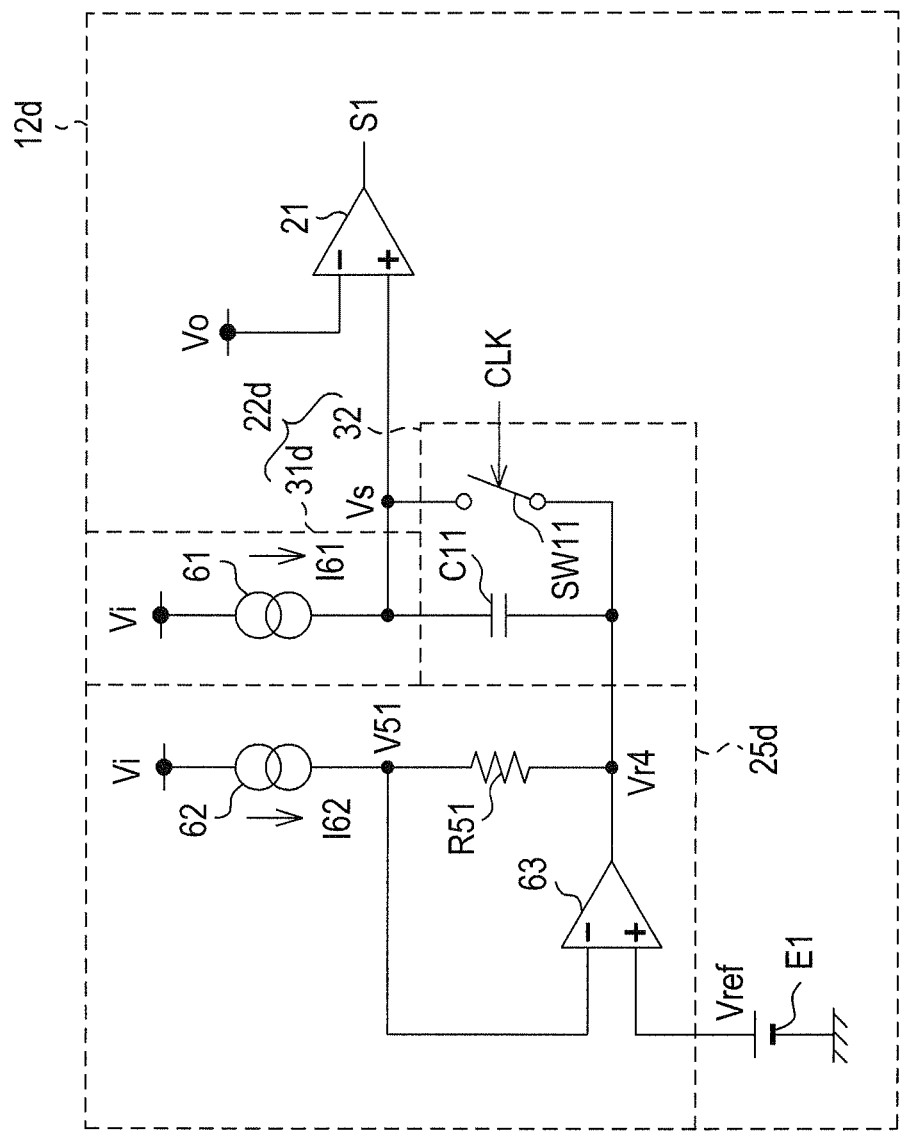
FIG. 12 is a circuit diagram of a control circuit according to a fifth embodiment

FIG. 12 is a circuit diagram of a control circuit 12d according to the fifth embodiment. The control circuit 12d may be used in place of the control circuit of each of the above described embodiments.

The control circuit 12d includes a comparator 21, a slope signal generation circuit 22d, a reference supply E1, and a standard voltage correction circuit (Vref correction circuit) 25d. The control circuit 12d includes an RS-flip flop circuit (RS-FF circuit) 23, and an oscillator 24 (refer to FIG. 6) as in the control circuit 12a according to the second embodiment, although the elements are not illustrated.

The slope signal generation circuit 22d includes a current generation circuit 31d and a charge and discharge circuit 32. The current generation circuit 31d includes a current source 61. The current source 61 is for supplying a current I61 to the charge and discharge circuit 32 to generate a slope signal by charging a capacitor C11 of the charge and discharge circuit 32. It is assumed that a peak voltage of a reference voltage Vs in one switching cycle is Vtop. The current source 61 is set so as to apply the current I61 to change a reference voltage Vs from a reset voltage to a given voltage (peak voltage Vtop) in one switching cycle (a period in which the switch SW (refer to FIGS. 1 and 6) is turned on).

The standard voltage correction circuit 25d includes a current source 62, an operational amplifier 63, and a resistor R51.

An input voltage Vi is supplied to a first terminal of the current source 62 and a second terminal of the current source 62 is coupled to a first terminal of the resistor R51. A second terminal of the resistor R51 is coupled to an output terminal of the operational amplifier 63. An inverting input terminal of the operational amplifier 63 is coupled to a node between the current source 62 and the resistor R51, and a reference voltage Vref is supplied to a non-inverting input terminal of the operational amplifier 63 from the reference supply E1.

The current source 62 supplies a current I62 so as to generate a potential difference between both terminals of a resistor R61 according to amplitude of the slope signal generated by the charge and discharge circuit 32. The operational amplifier 63 operates so as to make a voltage V51 at a node between the current source 62 and the resistor R51 substantially the same as a reference voltage Vref supplied to the non-inverting input terminal. Thus, a voltage at an output terminal of the operational amplifier 63, in other words, a voltage at a second terminal of the resistor R51 is a voltage that is lower than the reference voltage Vref by the amount of the potential difference generated between the both terminals of the resistor R51. The voltage is supplied to the charge and discharge circuit 32 of the slope signal generation circuit 22d as a corrected standard voltage Vr4.

The capacitor C11 of the charge and discharge circuit 32 superimposes the slope voltage generated by charging and discharging onto the corrected standard voltage Vr4 assuming the corrected standard voltage Vr4 as a reset voltage. Accordingly, the slope signal generation circuit 22d generates a reference voltage Vs by superimposing the slope signal onto the corrected standard voltage Vr4.

As described above, the duty of the switch SW, in other words, the amplitude of the slope signal (slope gradient) is changed according to an input voltage Vi in order to make an output voltage Vo to a desired voltage when an input voltage Vi changes or the input voltage Vi that is different from a given value is supplied to the DC-DC converter. In a configuration that superimposes a slope signal onto a reference voltage Vref, an input voltage is changed. In other words, the output voltage Vo is changed when the comparator 21 inverts the signal (outputs an H level signal S1) according to a gradient of the slope signal. Thus, as illustrated in FIG. 13, it is desirable that the reset voltage of the charge and discharge circuit 32 is changed according to the input voltage Vi. Hence, a current I61 supplied by the current source 61 and a current I62 supplied by the current source 62 are changed according to an input voltage Vi.

As a current source that supplies the current I61 and I62, a circuit configuration that supplies a current depending on an input voltage Vi and an output voltage Vo, or a circuit configuration that supplies a current depending on an input voltage Vi may be considered.

The current source that supplies a current depending on an input voltage Vi and an output voltage Vo includes, for example, the current generation circuit 31 (refer to FIG. 3) according to the first embodiment. The circuit configurations of the current sources 61 and 62 are configured so as to be substantially the same as the circuit configuration of the current generation circuit 31.

In this case, two different input voltages Vi are assumed to be an input voltage Vi1 and an input voltage Vi2. It is assumed that a potential that a reference voltage Vs and the output voltage Vo crosses (crossover potential) when the input voltage Vi1 is V1, and the crossover potential while the input voltage Vi2 is V2. The switching period is T, and a peak voltage Vtop, based on a relationship between the output voltage Vo and the reference voltage Vref, is expressed by:

$$Vtop=Vref+\alpha$$

where the $\alpha$ is proportional to (Vi−Vo), thus has a non-unit coefficient k2. When a coefficient of a slope gradient (1/sec) is k, the above described crossover potentials V1 and V2 are expressed by:

$$V1=Vref+k2*(Vi1-Vo))-k(Vi1-Vo)*(Vo/Vi1)*T \quad (1)$$

$$V2=Vref+k2*(Vi2-Vo))-k(Vi2-Vo)*(Vo/Vi2)*T \quad (2)$$

In order to stabilize an output voltage Vo, the expression, V1=V2 needs to be satisfied, thus the coefficient K is expressed by:

$$k=k2*Vi1*Vi2/(T*Vo^2) \quad (3)$$

In other words, an appropriate coefficient k enables V1 and V2 that are the crossover potentials to match the reference voltage Vs under given input voltages Vi1 and Vi2. A crossover voltage Vc, a peak voltage Vtop, and a corrected standard voltage Vr4 when an input voltage Vi is changed are calculated using the coefficient k, and FIG. 14 illustrates how the values change. As the result illustrates, the crossover voltage Vc may be substantially constant for the input voltage Vi. In other words, an output voltage Vo may be stabilized for a change of the input voltages Vi.

The current source that supplies a current depending on the input voltage Vi, for example, in the current generation circuit 31a (refer to FIG. 7) according to the second embodiment, may supply a voltage that is proportional to an input voltage Vi (for example, Vi/2) instead of the reference voltage Vref. The current sources 61 and 62 are configured so as to be substantially the same as the current generation circuit 31a.

In this case, it is assumed that the amplitude of a slope signal under an input voltage Vi1 is Vs1, and the amplitude of a slope signal under an input voltage Vi2 is β×Vs1 assuming the amplitude Vs1 under the input voltage Vi1 as a standard. The above described crossover potentials V1, V2, and the coefficient β are expressed by:

$$V1=Vtop-Vs1*(Vo/Vi1)*T \quad (4)$$

$$V2=Vtop-\beta*Vs1*(Vo/Vi2)*T \quad (5)$$

$$\beta=Vi2/Vi1 \quad (6)$$

Based on the result, the crossover voltage Vc may be maintained substantially constant for a change of the input voltage Vi. When a current source that depends on an input voltage Vi is used, the peak voltage Vtop does not change for a change of the input voltage Vi. The peak voltage Vtop becomes substantially the same as the reference voltage Vref, and thereby the crossover voltage Vc, the peak voltage Vtop, and the reference voltage Vref become substantially the same when the on-duty of the switch becomes substantially 0 under no load. As a result, variations in the output voltage Vo under no load for a change of the input voltage Vi may be suppressed.

As described above, according to the embodiment, the following effects may be achieved.

A potential that is substantially the same as the voltage between both terminals of the capacitor C11 for generating the slope voltage is caused at both terminals of the resistor R51 and a potential of a node between the resistor R51 and the current source 62 is made to be substantially the same as the reference voltage Vref by the operational amplifier 63. As a result, the corrected standard voltage Vr4 may be generated with high accuracy.

The current source 61 that supplies a current to the capacitor C11 and the current source 62 that causes a potential difference at the resistor R51 apply a current that depends on a differential voltage of an input voltage Vi and an output voltage Vo. Accordingly, the crossover voltage Vc may be maintained substantially constant for the input voltage Vi. In other words, the output voltage Vo may be stabilized for a change of the input voltage Vi.

The current source 61 that supplies a current to the capacitor C11 and the current source 62 that causes a potential difference at the resistor R51 are configured so that the current sources apply a current depending on the input voltage. Accordingly, the crossover voltage Vc may be maintained substantially constant for the input voltage Vi. In other words, the output voltage Vo may be stabilized for a change of the input voltage Vi.

(Sixth Embodiment)

Hereunder, a sixth embodiment will be described by referring to FIGS. 15 to 16. The same reference numerals are applied to the members etc. that are the same as those described in the above embodiments, and all or part of the explanation thereof will be omitted.

Figure 15:
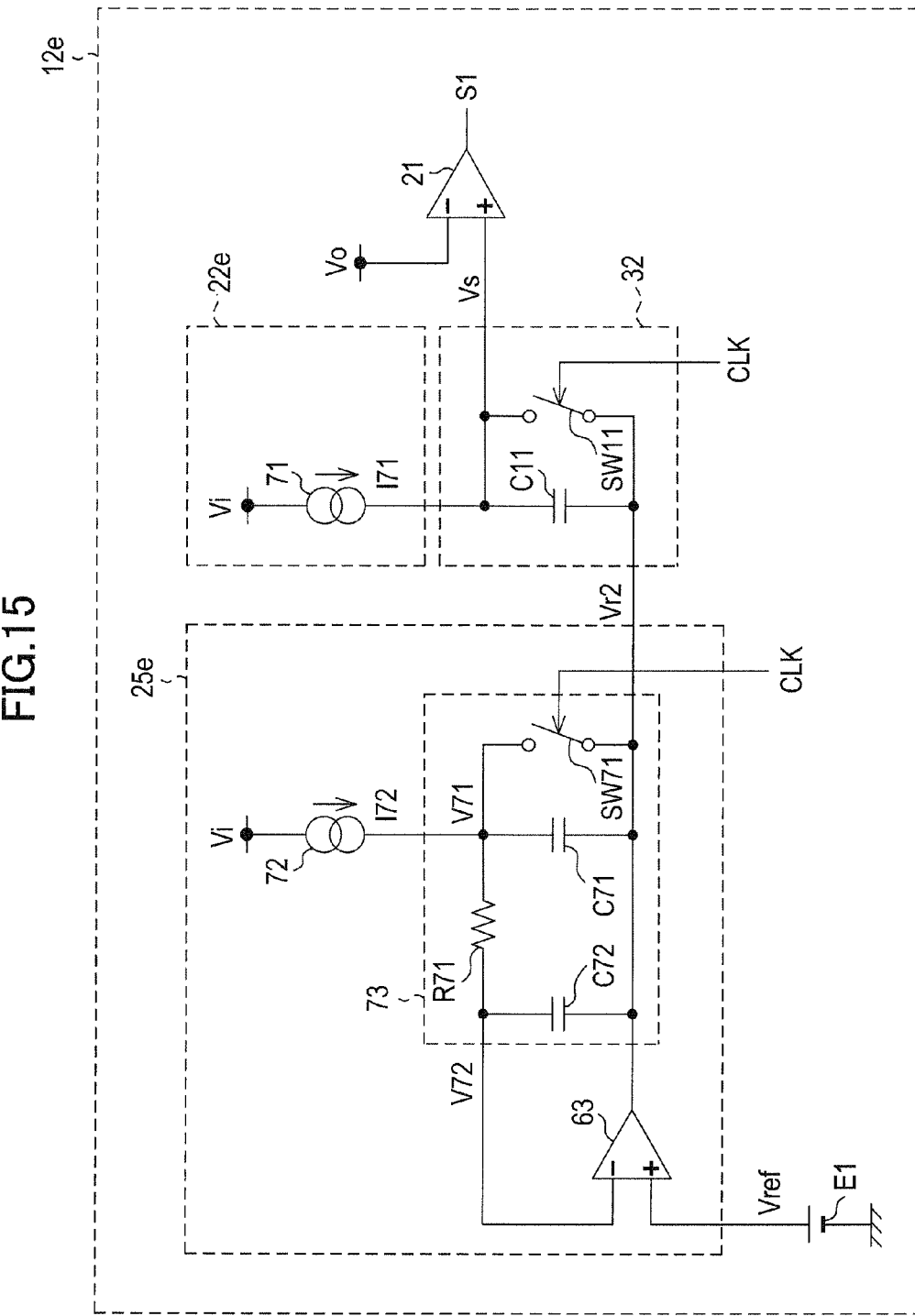
FIG. 15 is a circuit diagram of a control circuit according to a sixth embodiment.
Figure 16:
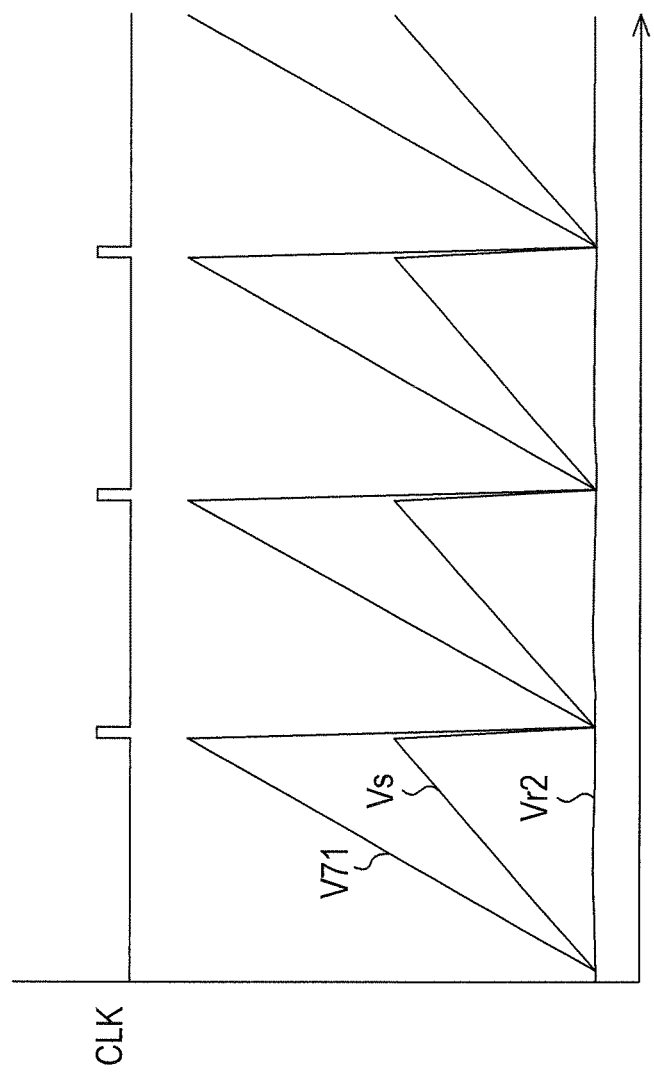
FIG. 16 is a waveform illustrating an operation of a control circuit illustrated in FIG. 15.

FIG. 15 is a circuit diagram of a control circuit 12e according to the sixth embodiment. The control circuit 12e may be used in place of the control circuit of the above described each of the embodiments.

The control circuit 12e includes a comparator 21, a slope signal generation circuit 22e, a reference supply E1, and a standard voltage correction circuit (Vref correction circuit) 25e. The control circuit 12e includes an RS-flip flop circuit (RS-FF circuit) 23, and an oscillator 24 (refer to FIG. 6) as in the control circuit 12a according to the second embodiment, although the elements are not illustrated.

The slope signal generation circuit 22e includes a current source 71 and a charge and discharge circuit 32. The current source 71 depends on an input voltage Vi and supplies a current I71 to the charge and discharge circuit 32 for generating a slope signal by charging a capacitor C11 of the charge and discharge circuit 32. It is assumed that a peak voltage of a reference voltage Vs in one switching cycle is Vtop. The current source 71 is set so as to apply the current I71 to change a reference voltage Vs from a reset voltage to a given voltage (peak voltage Vtop) in one switching cycle (a period in which the switch SW (refer to FIGS. 1 and 6) is turned on). The current source 71 may be configured to apply a current that depends on an input voltage Vi and an output voltage Vo.

The standard voltage correction circuit 25e includes a current source 72, an operational amplifier 63, and a constant voltage generation unit 73. The current source 72 depends on an input voltage Vi as in the above described current source 71 and supplies a current I72 that is two times the current I71 that the current supply 71 applies to the constant voltage generation unit 73.

The constant voltage generation unit 73 includes capacitors C71 and C72, a resistor R71, and a switch SW71. The current source 71 is coupled to a first terminal of the capacitor C71 and a second terminal of the capacitor C71 is coupled to an output terminal of the operational amplifier 63. The switch SW71 is coupled in parallel with the capacitor C71. The switch SW71 is, for example, an n-channel MOS transistor and a source and a drain of the switch SW71 are coupled to both terminals of the capacitor C71, and a gate (control terminal) of the switch SW71 is supplied with a clock signal CLK. In other words, the capacitor C71 and the switch SW71 are coupled in substantially the same manner as the capacitor C11 and the switch SW11 in the charge and discharge circuit 32. A capacitance value of the capacitor C71 is set substantially the same as the capacitance value of the capacitor C11. Hence, the capacitor C71 accumulates electric charges according to the current I71 that the current source 72 applies during an off-period of the switch SW71 (on-period of the switch SW)

Charged electricity of the capacitor C71 increases from a reset voltage (in this case, an output voltage of the operational amplifier 63) with a gradient according to the current I72 during an off-period of the switch SW71 in one switching cycle, and is discharged to the reset voltage by turning-on the switch SW 71. The current source 72 is set so as to apply a current two times the current that the current source 71 applies. Therefore, the potential difference between both terminals of the capacitor C71 is a value that is two times the potential difference between both terminals of the capacitor C11 in the charge and discharge circuit 32. In other words, as illustrate in FIG. 16, a voltage V71 between the current source 72 and the capacitor C71 becomes a slope waveform which changes with a gradient that is two times the gradient of the reference voltage Vs generated by the charge and discharge circuit 32.

The current source 72 is coupled to a first terminal of the resistor R71, a second terminal of the resistor R71 is coupled to an inverting input terminal of the operational amplifier 63 and a first terminal of the capacitor C72, and a second terminal of the capacitor C72 is coupled to an output terminal of the operational amplifier 63. In a low-pass filter that includes the resistor R71 and the capacitor C72, a cut-off frequency of a low-pass filter set by a resistance value of the resistor R71 and a capacitance value of the capacitor C72 is set so as to be a fraction (for example, one tenth or lower) of the switching frequency of the switch SW.

The low-pass filter smoothes the voltage V71 by the charged electricity of the capacitor C71. Hence, a potential difference between both terminals of the capacitor C72 becomes a value substantially the same as ½ of the potential difference between both terminals of the capacitor C71, in other words, the potential difference between both terminals of the capacitor C11 in the charge and discharge circuit 32.

The operational amplifier 63 changes an output voltage V72 at a coupling point between the resistor R71 and the capacitor C72 so as to be substantially the same as the reference voltage Vref. Therefore, the corrected standard voltage Vr2 is determined by capacitance values of the each of capacitor C11 and C71 and current values of the current I71 and I72. As described above, the corrected standard voltage Vr2 is determined by relative accuracy of capacitors. Thus, errors of the corrected standard voltage Vr2 and the reference voltage Vs may be reduced.

According to the embodiment, the capacitance value of the capacitor C11 in the charge and discharge circuit 32 and the capacitance value of the capacitor C72 of the constant voltage generation unit 73 are substantially the same so that the current source 72 applies a current that is two times the current that the current source 71 applies. According to the embodiment, a potential difference between the both terminals of the capacitor C72 may be substantially the same as the amplitude (amplitude of the slope signal) of the reference voltage Vs generated by the charge and discharge circuit 32, and values of each of the elements and electric characteristics of the current source may be appropriately changed.

As described above, according to the embodiment, the following effects may be achieved.

The operational amplifier 63 changes the voltage V72 at a coupling between the resistor R71 and the capacitor C72 so as to be substantially the same as the reference voltage Vref. Thus, the corrected standard voltage Vr2 is determined by the capacitance values of each of the capacitor C11 and C71 and the current values of the current I71 and I72. As described above, the corrected standard voltage Vr2 is determined by relative accuracy of the capacitors. Thus, errors of the corrected standard voltage Vr2 and the reference voltage Vs may be reduced.

(Seventh Embodiment)

Hereunder, a seventh embodiment will be described by referring to FIG. 17. The same reference numerals are applied to the members etc. that are the same as those described in the above embodiments, and all or part of the explanation thereof will be omitted.

Figure 17:
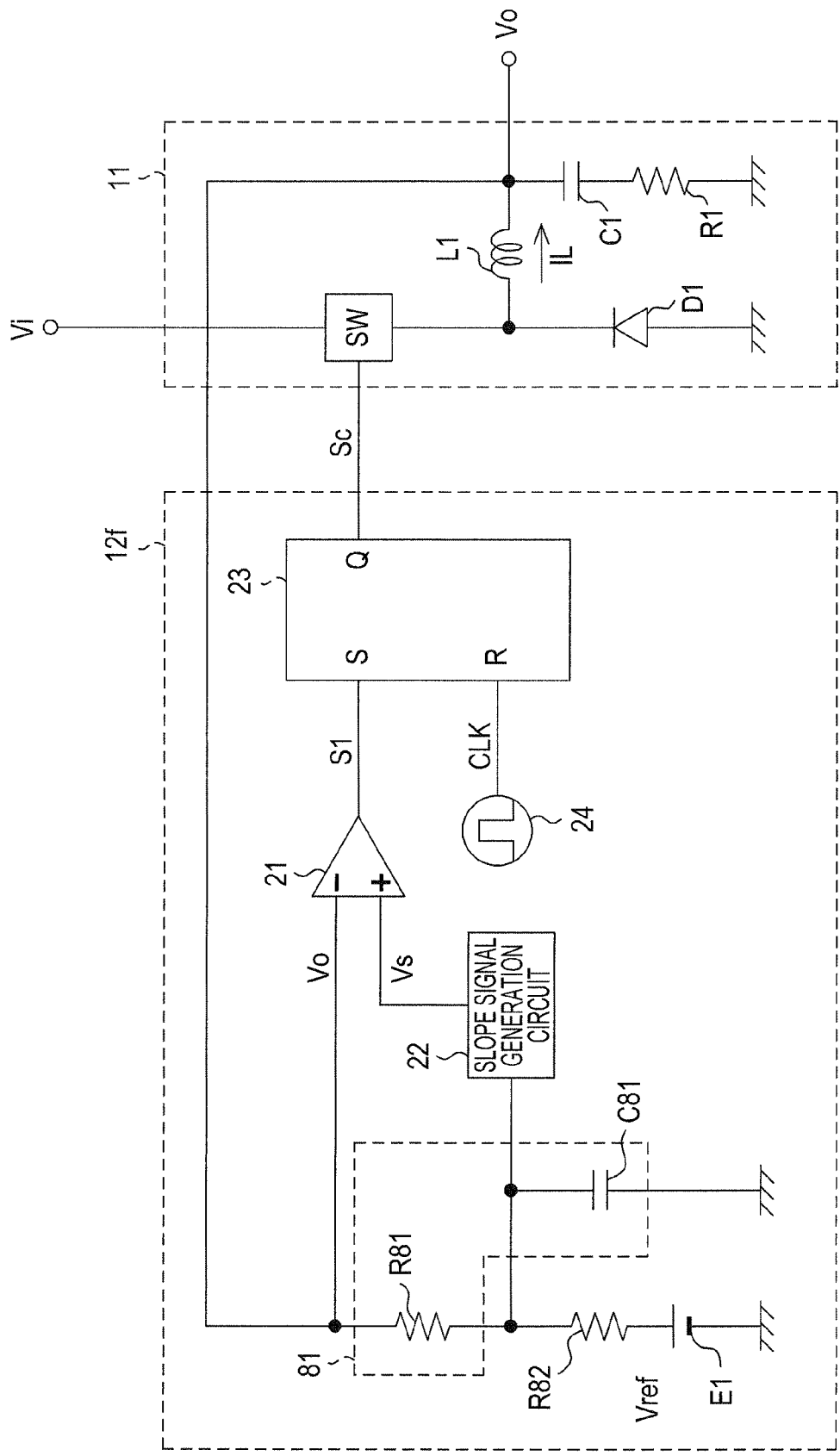
FIG. 17 is a block circuit diagram of a DC-DC converter according to a seventh embodiment.

As illustrated in FIG. 17, a DC-DC converter includes a converter unit 11 that generates an output voltage Vo based on an input voltage Vi and a control circuit 12f that controls the converter unit 11 based on an output voltage Vo.

The control circuit 12f includes a comparator 21, a slope signal generation circuit 22, an RS-flip flop circuit (RS-FF circuit) 23, an oscillator 24, a reference supply E1, and a low-pass filter (LPF) 81.

The low-pass filter 81 includes a resistor R81 and a capacitor C81. An output voltage Vo is supplied to a first terminal of the resistor R81 and a second terminal of the resistor R81 is coupled to a first terminal of the capacitor C81, and a second terminal of the capacitor C81 is coupled to a ground. A second terminal of the resistor R81 is coupled to a first terminal of a resistor R82 and a second terminal of the resistor R82 is supplied with a reference voltage Vref of the reference supply E1.

A resistance value of the resistor R81 is set to 2 to 5 times of the resistance value of the resistor R82. A cut-off frequency of a low-pass filter set by a resistance value of the resistor R81 and a capacitance value of the capacitor C81 are set so as to be a fraction of the switching frequency of the switch SW.

The resistor R81 and the resistor R82 function as adder circuits. In other words, the reference supply E1 and an output voltage Vo are synthesized by the resistors R82 and R81 and the synthesized voltage is supplied to the slope signal generation circuit 22 through the low-pass filter by the capacitor C81.

When an output voltage Vo decreases, a voltage in which a reference voltage Vs and an output voltage Vo cross decreases and a pulse width of a control signal Sc increases. An abrupt change of an output voltage Vo causes an abrupt output current change, and thereby makes the output voltage unstable. According to the embodiment, a voltage supplied to the slope signal generation circuit 22 decreases as an output voltage Vo decreases, and a change amount of the pulse width of the control signal Sc decreases compared with a configuration in which an output voltage Vo is not added. Thus, the embodiment may suppress variations in an output current and stabilize the output voltage.

As described above, according to the embodiment, the following effects may be achieved.

A voltage supplied to the slope signal generation circuit 22 decreases as an output voltage Vo decreases, and a change amount of the pulse width of the control signal Sc decreases compared with a configuration in which an output voltage Vo is not added. Thus, the embodiment may suppress variations in an output current and stabilize the output voltage.

(Eighth Embodiment)

Hereunder, an eighth embodiment will be described by referring to FIG. 18. The same reference numerals are applied to the members etc. that are the same as those described in the above embodiments, and all or part of the explanation thereof will be omitted.

Figure 18:
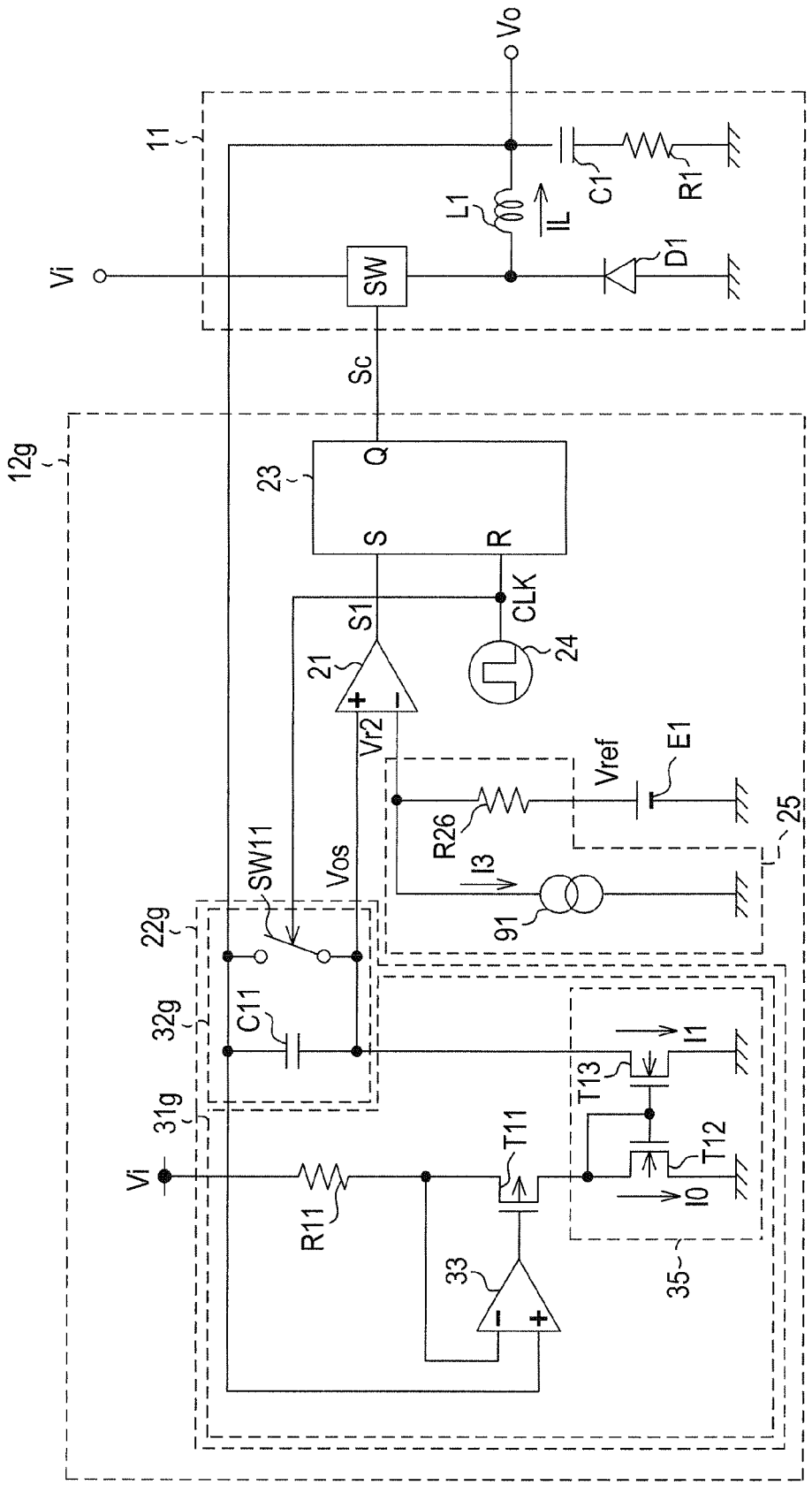
FIG. 18 is a block circuit diagram of a DC-DC converter according to an eighth embodiment.

As illustrated in FIG. 18, a DC-DC converter includes a converter unit 11 that generates an output voltage Vo based on an input voltage Vi and a control circuit 12g that controls the converter unit 11 based on the output voltage Vo.

The control circuit 12g includes a comparator 21, a slope signal generation circuit 22g, an RS-flip flop circuit (RS-FF circuit) 23, an oscillator 24, a reference supply E1, and a standard voltage correction circuit 25.

The slope signal generation circuit 22g includes a current generation circuit 31g and a charge and discharge circuit 32g.

The current generation circuit 31g includes an operational amplifier 33, a current mirror circuit 35, a resistor R11, and a transistor T11. In other words, the current generation circuit 31g according to the embodiment does not include the current mirror circuit 36 in the current generation circuit 31 according to the first embodiment (refer to FIG. 3), and a transistor T13 included in the current mirror circuit 35 is coupled to the charge and discharge circuit 32. Therefore, the slope signal generation circuit 22g according to the embodiment operates so that a current I1 that is 1/n of the current I0 that flows through the transistor T12 is extracted from the charge and discharge circuit 32g.

The charge and discharge circuit 32g includes a capacitor C11 and a switch SW11 as in the charge and discharge circuit 32 according to the first embodiment (refer to FIG. 3). An output voltage Vo is supplied to a first terminal of the capacitor C11, and a second terminal of the capacitor C11 is coupled to the transistor T13. The switch SW11 that is turned on and off in response to a clock signal CLK is coupled in parallel with the capacitor C11. In other words, the slope signal generation circuit 22g according to the embodiment superimposes a slope signal onto the output voltage Vo and generates a comparison voltage Vos that is decreased from the output voltage Vo according to the current IL The standard voltage correction circuit 25 includes a current source 91 and a resistor R26. The current source 91 is for causing a voltage drop at the resistor R26 and includes a duty conversion circuit 41, a differential circuit 42, a standard voltage generation circuit 43, a sample hold circuit 45, and a transistor T25 according to the second embodiment. The standard voltage correction circuit 25 generates a corrected standard voltage Vr2 by adding a corrected voltage to the reference voltage Vref. The comparator 21 compares the comparison voltage Vos with the corrected standard voltage Vr2 and generates a signal S1 based on the comparison result.

As described above, according to the embodiment, the following effects may be achieved. The control circuit 12g generates a comparison voltage Vos by superimposing a slope voltage onto an output voltage Vo, and compares the comparison voltage Vos with the corrected standard voltage Vr2. Based on the comparison result, the switch SW is turned on, and the switch is turned-off in response to a clock signal CLK.

The above described configuration may not need an error amplifier, and thereby a high-speed response and response to a load change in a short time may be achieved, in other words, a high-speed response to an abrupt load change may be achieved. The switch SW is turned off in a substantially constant period, thus variations in the switching frequency may be suppressed. As a result, noise measures may be taken easily.

The above described embodiments may be embodied by the following modes.

In the first embodiment, the capacitor C11 is charged with the current I1 according to a differential voltage of an input voltage Vi and an output voltage Vo and generates a slope signal with a gradient (change amount) depending on the differential voltage of the input voltage Vi and the output voltage Vo. A small semiconductor device in which an input voltage Vi is not changed or the extent of the change is within approximately two times may not need to charge the capacitor C11 according to a differential voltage, thus a slope signal generation circuit that does not depend on a differential voltage may be used, in other words, a constant current source may charge the capacitor C11 and generate a slope signal.

In the above described respective embodiments, an output voltage Vo is input to the comparator 21; however a voltage that is proportional to an output voltage Vo, for example, a divided voltage obtained by dividing an output voltage Vo by a voltage dividing circuit, may be input to the comparator.

All examples and conditional language recited herein are intended for pedagogical purposes to aid the reader in understanding the principles of the invention and the concepts contributed by the inventor to furthering the art, and are to be construed as being without limitation to such specifically recited examples and conditions. Although the embodiments of the present inventions have been described in detail, it should be understood that the various changes, substitutions, and alterations could be made hereto without departing from the spirit and scope of the invention.

The invention claimed is:

1. A DC-DC converter control circuit comprising:
  a slope signal generation circuit that generates a reference voltage by superimposing a slope voltage onto a standard voltage;
  a comparator that performs comparison of the reference voltage with an output voltage and generates a comparator output signal according to a result of the comparison, a not-inverting input terminal of the comparator coupled to the reference voltage and an inverting input terminal of the comparator coupled to the output voltage;

an oscillator that generates a pulse signal with a substantially constant cycle;

a control signal generation circuit that generates a control signal that controls to turns on a switch based on the comparator output signal and turns off the switch based on the pulse signal; and a voltage correction circuit that corrects the reference voltage according to one of an input voltage and a differential voltage of the input voltage and the output voltage, wherein the control signal generation circuit includes a RS flip-flop circuit having a set terminal coupled to an output of the comparator and a reset terminal coupled to an output of the oscillator, wherein the RS flip-flop circuit is set by supplying the output of the comparator to the set terminal and is reset by supplying the output of the oscillator to the reset terminal, wherein the slope signal generation circuit controls the slope amount so that a slope voltage increase rate becomes larger than an output voltage increase rate according to one of the input voltage and the differential voltage of the input voltage and the output voltage, wherein the voltage correction circuit decreases the reference voltage when the slope voltage increase rate becomes larger than the output voltage increase rate.

2. A DC-DC converter control circuit comprising:

a control circuit that controls a switch coupled between an input end to which an input voltage is applied and an output end from which an output voltage is output, and the input end by a switching control signal according to a comparison between a reference voltage with a slope and the output voltage;

a slope signal generation circuit that controls a slope amount of the slope voltage according to any of the input voltage and a differential voltage of the input voltage and the output voltage to generate a reference voltage; and a voltage correction circuit that corrects the reference voltage according to one or the input voltage and the differential voltage of the input voltage and the output voltage, wherein the control signal generation circuit includes:

a comparator that performs comparison of the reference voltage with the output voltage and generates a signal according to a result of the comparison, a not-inverting input terminal of the comparator coupled to the reference voltage and an inverting input terminal of the comparator coupled to the output voltage;

an oscillator that generates a pulse signal with a substantially constant cycle; and a RS flip-flop circuit having a set terminal coupled to an output of the comparator and a reset terminal coupled to an output of the oscillator, wherein the RS flip-flop circuit is set by supplying the output of the comparator to the set terminal and is reset by supplying the output of the oscillator to the reset terminal, wherein the slope signal generation circuit controls the slope amount so that a slope voltage increase rate becomes larger than an output voltage increase rate according to one of the input voltage and the differential voltage of the input voltage and the output voltage, and wherein the voltage correction circuit decreases the reference voltage when the slope voltage increase rate becomes larger than the output voltage increase rate.

3. The DC-DC converter control circuit according to claim 2, wherein the voltage correction circuit further corrects the reference voltage according to a duty of the switch.

4. The DC-DC converter control circuit according to claim 2, wherein the voltage correction circuit includes: a duty conversion circuit that generates a first voltage according to an on-duty of the switch; a standard voltage generation circuit that generates a second voltage according to a standard duty of the switch; a differential circuit that shunts a current from a current source into a first route and a second route according to a potential difference of the first voltage and the second voltage; and a potential difference generation circuit that generates a potential difference between both terminals of an element according to a current that flows through the first route, wherein the voltage correction circuit corrects the reference voltage by the potential difference between the both terminals of the element.

5. The DC-DC converter control circuit according to claim 2, wherein the slope signal generation circuit generates a second slope voltage that is proportional to the slope voltage, and the voltage correction circuit generates a first corrected voltage that is obtained by decreasing a given voltage by an integral multiple of a correction amount that corrects the reference voltage and includes a synthesis circuit that generates the reference voltage by synthesizing the second slope voltage and the first corrected voltage.

6. The DC-DC converter control circuit according to claim 2, wherein the slope signal generation circuit includes: a capacitor; a switch that is coupled in parallel with the capacitor; and a current generation circuit that supplies a current to the capacitor, charges and discharges the capacitor by turning on and off the switch according to a switching cycle of the switch, and generates the slope voltage with an accumulated electric charge of the capacitor.

7. The control circuit of the DC-DC converter according to claim 6, wherein the voltage correction circuit includes: an element that causes a potential difference between a first terminal and a second terminal; a current source that supplies a current so as to cause a potential difference between the first terminal and the second terminal of the element according to a potential difference between both terminals of the capacitor; and an operational amplifier that receives inputs of a voltage between the current source and the element and a given voltage, and that includes an output terminal which is coupled to the second terminal of the element.

8. The DC-DC converter control circuit according to claim 6, wherein the voltage correction circuit includes: a second capacitor; a second switch that is coupled in parallel with the second capacitor; a current source that supplies a current so as to cause a potential difference between a first terminal and a second terminal of the second capacitor according to a potential difference of both terminals of the capacitor; a low-pass filter that is coupled between the first terminal and the second terminal of the second capacitor; and an operational amplifier that receives a voltage obtained by smoothing a voltage at the first terminal of the second capacitor by the low-pass filter and a given voltage, and that includes an output terminal which is coupled to the second terminal of the second capacitor.

9. The DC-DC converter control circuit according to claim 2, comprising a low-pass filter that receives the output voltage, wherein the low-pass filter includes a first resistor and a capacitor that are coupled in series and a given voltage is supplied to a coupling point between the first resistor and the capacitor through a second resistor, and the slope signal generation circuit generates the reference voltage by superimposing the slope voltage onto a voltage at the coupling point.

10. A DC-DC converter comprising:
an inductor that is coupled between an input end to which an input voltage is applied and an output end to which an output voltage is applied;
a switch that is coupled between the input end and the inductor;
a control circuit that performs switching control of the switch according to a comparison of a reference voltage with a slope and the output voltage;
a slope signal generation circuit that changes a slope amount of the slope voltage according to one of the input voltage and a differential voltage of the input voltage and the output voltage to generate a reference voltage; and
a voltage correction circuit that corrects the reference voltage according to one of the input voltage and the differential voltage of the input voltage and the output voltage,
wherein the control signal generation circuit includes:
a comparator that performs comparison of the reference voltage with the output voltage and generates a signal according to a result of the comparison, a not-inverting input terminal of the comparator coupled to the reference voltage and an inverting input terminal of the comparator coupled to the output voltage;
an oscillator that generates a pulse signal with a substantially constant cycle; and
a RS flip-flop circuit having a set terminal coupled to an output of the comparator and a reset terminal coupled to an output of the oscillator,
wherein the RS flip-flop circuit is set by supplying the output of the comparator to the set terminal and is reset by supplying the output of the oscillator to the reset terminal,
wherein the slope signal generation circuit controls the slope amount so that a slope voltage increase rate becomes larger than an output voltage increase rate according to one of the input voltage and the differential voltage of the input voltage and the output voltage, and
wherein the voltage correction circuit decreases the reference voltage when the slope voltage increase rate becomes larger than the output voltage increase rate.

11. A DC-DC converter control method comprising:
generating a second voltage by superimposing a slope voltage onto one of a standard voltage and a voltage proportional to an output voltage, when a first voltage is assumed to be one of the standard voltage; generating the second voltage by superimposing the slope voltage onto the standard voltage when the first voltage is assumed to be the voltage proportional to the output voltage;
turning a switch to an on-state based on a comparison result of the first voltage and the second voltage, and turning the switch to an off-state based on a pulse signal that is output in substantially constant cycle;
correcting the reference voltage according to one of the input voltage and a differential voltage of the input voltage and the output voltage;
controlling the slope amount so that a slope voltage increase rate becomes larger than an output voltage increase rate according to one of the input voltage and a differential voltage of the input voltage and the output voltage; and
decreasing the reference voltage when the slope voltage increase rate becomes larger than the output voltage increase rate,
wherein the turning is controlled based on a control signal which is generated by a control signal generation circuit, and
wherein the control signal generation circuit includes:
a comparator that performs comparison of the second voltage with the output voltage and generates the comparison result, a not-inverting input terminal of the comparator coupled to the reference voltage and an inverting input terminal of the comparator coupled to the output voltage;
an oscillator that generates a pulse signal with a substantially constant cycle; and
a RS flip-flop circuit having a set terminal coupled to an output of the comparator and a reset terminal coupled to an output of the oscillator,
wherein the RS flip-flop circuit is set by supplying the output of the comparator to the set terminal and is reset by supplying the output of the oscillator to the reset terminal.

12. A DC-DC converter control method comprising:
comparing a voltage that is proportional to an output voltage with a reference voltage with a slope;
outputting the output voltage by switching control of a switch coupled in series with an inductor based on a result of the comparing;
changing a slope amount of the slope according to one of the input voltage and the differential voltage of the input voltage and the output voltage;
correcting the reference voltage according to one of the input voltage and a differential voltage of the input voltage and the output voltage;
controlling the slope amount so that a slope voltage increase rate becomes larger than an output voltage increase rate according to one of the input voltage and a differential voltage of the input voltage and the output voltage; and
decreasing the reference voltage when the slope voltage increase rate becomes larger than the output voltage increase rate,
wherein the switching control is controlled based on a control signal which is generated by a control signal generation circuit, and
wherein the control signal generation circuit includes:
a comparator that performs comparison of the reference voltage with the output voltage and generates the comparison result; a not-inverting input terminal of the comparator coupled to the reference voltage and an inverting input terminal of the comparator coupled to the output voltage;
an oscillator that generates a pulse signal with a substantially constant cycle; and
a RS flip-flop circuit having a set terminal coupled to an output of the comparator and a reset terminal coupled to an output of the oscillator,
wherein the RS flip-flop circuit is set by supplying the output of the comparator to the set terminal and is reset by supplying the output of the oscillator to the reset terminal.

13. The DC-DC converter control method according to claim 12, further comprising: correcting the reference voltage according to a duty of the switch.

14. The DC-DC converter control method according to claim 12, further comprising:
generating a second slope voltage that is proportional to the slope voltage and a first corrected voltage that is obtained by decreasing a given voltage by an integral multiple of a correction amount that corrects the reference voltage; and synthesizing the second slope voltage and the first corrected voltage to generate the reference voltage.

* * * * *

UNITED STATES PATENT AND TRADEMARK OFFICE
CERTIFICATE OF CORRECTION

| | | |
|---|---|---|
| PATENT NO. | : 8,587,265 B2 | Page 1 of 1 |
| APPLICATION NO. | : 12/717681 | |
| DATED | : November 19, 2013 | |
| INVENTOR(S) | : Nishimori et al. | |

It is certified that error appears in the above-identified patent and that said Letters Patent is hereby corrected as shown below:

In the Claims:

Claim 2, column 25, line 42, "or" should read --of--.

Signed and Sealed this
Thirteenth Day of May, 2014

Michelle K. Lee
*Deputy Director of the United States Patent and Trademark Office*